(12) United States Patent
Takeda

(10) Patent No.: US 8,155,829 B2
(45) Date of Patent: Apr. 10, 2012

(54) COMMON CONTROL APPARATUS AND VEHICLE CONTROL SYSTEM

(75) Inventor: Toshihiko Takeda, Chiryu (JP)

(73) Assignee: Denso Corporation, Kariya (JP)

( * ) Notice: Subject to any disclaimer, the term of this patent is extended or adjusted under 35 U.S.C. 154(b) by 720 days.

(21) Appl. No.: 12/273,761

(22) Filed: Nov. 19, 2008

(65) Prior Publication Data

US 2009/0132118 A1 May 21, 2009

(30) Foreign Application Priority Data

Nov. 21, 2007 (JP) .................................. 2007-301742
Jan. 9, 2008 (JP) .................................. 2008-002325

(51) Int. Cl.
*G06F 7/00* (2006.01)

(52) U.S. Cl. ......... 701/36; 701/33.4; 701/34.3; 340/438

(58) Field of Classification Search ................ 701/1, 29, 701/33, 35, 36, 49, 33.4, 29.7, 34.3; 340/425.5, 340/438, 439

See application file for complete search history.

(56) References Cited

U.S. PATENT DOCUMENTS

| | | | |
|---|---|---|---|
| 5,034,686 A * | 7/1991 | Aspelin | 324/537 |
| 5,388,089 A | 2/1995 | Odaka et al. | |
| 5,388,243 A * | 2/1995 | Glider et al. | 710/38 |
| 5,513,107 A | 4/1996 | Gormley | |
| 6,377,860 B1 | 4/2002 | Gray et al. | |
| 6,525,432 B2 | 2/2003 | Heckmann et al. | |
| 6,838,852 B1 | 1/2005 | Namuduri | |
| 6,847,864 B2 | 1/2005 | Goto et al. | |
| 6,859,708 B2 | 2/2005 | Hashimoto et al. | |
| 7,228,213 B2 | 6/2007 | Sakai et al. | |
| 2006/0089963 A1 | 4/2006 | Vollmer et al. | |
| 2007/0081473 A1 | 4/2007 | Jiang | |
| 2007/0150118 A1 | 6/2007 | Takamatsu et al. | |
| 2008/0155405 A1 | 6/2008 | Lock et al. | |

FOREIGN PATENT DOCUMENTS

| | | |
|---|---|---|
| EP | 0 791 506 | 8/1997 |
| EP | 0 987 628 | 3/2000 |
| EP | 1 085 691 | 3/2001 |
| EP | 1 862 357 | 12/2007 |
| JP | 03-128542 | 5/1991 |

(Continued)

OTHER PUBLICATIONS

Extended European Search Report dated Sep. 3, 2010, issued in corresponding European Application No. 08020307.8-2416.

(Continued)

*Primary Examiner* — Gertrude Arthur Jeanglaude
(74) *Attorney, Agent, or Firm* — Nixon & Vanderhye P.C.

(57) ABSTRACT

A common control unit in an intra box performs common control that is independent from behavior control for controlled objects extracted from function domain controllers. A control condition management unit manages control conditions that are commonly used by the function domain controllers for performing the behavior control. An inspection unit inspects abnormality of the behavior control by the function domain controllers. A resource management unit manages distribution as well as residue amount, storage, and use restriction of commonly owned resource. A plug and play management unit manages system configuration of a vehicle control system. By using the above units, the vehicle control system reduces processing load of function domain controllers for performing the behavior control in respective function domains as well as adaptation operation of the function domain controllers to the system configuration.

72 Claims, 16 Drawing Sheets

FOREIGN PATENT DOCUMENTS

| | | |
|---|---|---|
| JP | 06-324138 | 11/1994 |
| JP | 7-123483 | 5/1995 |
| JP | 7-131464 | 5/1995 |
| JP | 09-160602 | 6/1997 |
| JP | 11-027297 | 1/1999 |
| JP | 11-334494 | 12/1999 |
| JP | 2001-239901 | 9/2001 |
| JP | 2003-018163 | 1/2003 |
| JP | 2003-118511 | 4/2003 |
| JP | 2004-122943 | 4/2004 |
| JP | 2005-088677 | 4/2005 |
| JP | 2005-123766 | 5/2005 |
| JP | 2005-191789 | 7/2005 |
| JP | 2005-246988 | 9/2005 |
| JP | 2005-291173 | 10/2005 |
| JP | 2006-191339 | 7/2006 |
| JP | 2006-219009 | 8/2006 |
| JP | 2006-290168 | 10/2006 |
| JP | 2006-298260 | 11/2006 |
| JP | 2007-028377 | 2/2007 |
| JP | 2007-118701 | 5/2007 |
| JP | 2007-118945 | 5/2007 |
| JP | 2007-145226 | 6/2007 |
| JP | 2007-230452 | 9/2007 |
| JP | 2007-253773 | 10/2007 |
| WO | WO 02/08892 | 1/2002 |
| WO | WO 02/088967 | 11/2002 |
| WO | WO 2004/064475 | 8/2004 |
| WO | WO 2004/098127 | 11/2004 |
| WO | WO 2005/053244 | 6/2005 |
| WO | WO 2005/053245 | 6/2005 |
| WO | WO 2006/109139 | 10/2006 |

OTHER PUBLICATIONS

Extended European Search Report dated May 6, 2010, issued in corresponding European Application No. 08020307.8-2416.

Japanese Office Action dated Feb. 16, 2010, issued in corresponding Japanese Application No. 2007-301742, with English translation.

Japanese Office Action dated Feb. 23, 2010, issued in corresponding Japanese Application No. 2008-002325, with English translation.

* cited by examiner

COMMON CONTROL APPARATUS AND VEHICLE CONTROL SYSTEM

CROSS REFERENCE TO RELATED APPLICATION

The present application is based on and claims the benefit of priority of Japanese Patent Applications No. 2007-301742 filed on Nov. 21, 2007 and No. 2008-2325 filed on Jan. 9, 2008, the disclosures of which are incorporated herein by reference.

FIELD OF THE INVENTION

The present disclosure generally relates to a vehicle control system for use in a vehicle.

BACKGROUND INFORMATION

Conventionally, a vehicle control system controls behavior of controlled objects disposed in a vehicle by performing behavior control for each of multiple domain controllers (e.g., multiple units of controlling device) that respectively govern function domains. For example, Japanese patent document JP-A-2001-239901 discloses one of the vehicle control systems for such purpose.

When the vehicle is controlled by the vehicle control system having multiple control units that are disposed in a distributed manner, each of the control units has to perform common control such as execution scheduling or the like that is commonly performed by each of the multiple control units independently from the function of the controlled objects besides performing the behavior control corresponding to the function of the controlled objects.

However, the control unit has to establish communication with other control units and to exchange information for cooperatively performing the common control that is performed commonly among the control units. Therefore, communication traffic is increased for the exchange of information between the control units, and processing load for each of the control units is increased accordingly.

Further, when the common control is configured to be performed through communication between the control units, the control units have to be adapted for configuration change in the vehicle control system for, for example, each of vehicle types and models having respectively different system configurations with different number of control units.

SUMMARY OF THE INVENTION

In view of the above and other problems, a common control apparatus for use in a vehicle enables a reduced processing load for each of the multiple control units for controlling a function domain that govern behavior of controlled objects in the function domain, and also enables a reduced adaptation operation for adapting the control units for different system configurations. The common control apparatus serves as a vehicle control apparatus and a vehicle control system when implemented in a vehicle.

In an aspect of the present disclosure, the common control apparatus includes: a plurality of controllers for providing processing; and an interface unit for interfacing with the plurality of controllers in terms of establishing communication. In the apparatus, the information is acquired from and provided for each of the plurality of controllers through the interface unit independently from processing of each of the controllers. Further, a common control unit for managing the plurality of controllers that control respective function domains of controlled objects in a vehicle by performing common control that is common for the plurality of controllers through the interface unit is provided. Furthermore, the plurality of controllers respectively performs behavior control of controlled objects in the function domains, and the common control is independent from the behavior control of the controlled objects. In this case, the common control that is common for the plurality of controllers indicates the control, regardless of an actual number of the controllers that perform the control that is commonly performed by the controllers.

In other words, by extracting the common control from the controllers and collectively providing the common control by the common control unit, the communication traffic for the common control as well as processing load for the controllers is reduced in comparison to distributed common control processing in respective controllers.

Further, by providing the common control unit, the configuration change in the vehicle control apparatus is absorbed by the common control unit in terms of the common control that is independent from the behavior control by the controllers regardless of the number of controllers, that is, regardless of whether there are multiple controllers or only one controller in the vehicle control apparatus. In addition, the adaptation operation for adapting the controllers to the configuration change is also reduced.

Furthermore, due to the collective execution of the common control by the common control unit, the management of the controllers based on the common control is facilitated. That is, for example, the schedule of the behavior control by the multiple controllers can be easily adjusted.

Furthermore, by only changing the vehicle type specific portion of the communication setting, a generic vehicle control apparatus can be used in various vehicle types for adjusting the communication setting for the controllers.

In another aspect of the invention, the communication setting unit is provided as a separate unit from the controllers for the adjustment of communication setting. The separate unit indicates that the communication setting unit is functionally, not physically, separated from the controllers. In other words, the hardware (i.e., a processor) of the communication setting unit is not necessarily separate from the hardware (i.e., a processor) of the controllers. That is, for example, a part of the controller and a part of the communication setting unit may be implemented on the same processor. The processor in this case includes a CPU, a ROM, a RAM and the like.

By having the communication setting unit as a separate unit, adjustments of the communication setting is collectively performed by the communication setting unit, thereby enabling the reduction of hardware and software in total in comparison to the configuration that provides communication setting adjustment function in each of the controllers.

Further, addition and removal of the controllers to and from the communication system can be easily accommodated as well as the configuration change of the hardware/software of the controllers by the above configuration scheme. That is, for example, "Plug and Play" of the controllers is enabled in the vehicle control apparatus.

In yet another aspect of the invention, the cooperation control unit and the cooperation adjustment unit are separately provided from the controllers in the vehicle control apparatus. That is, the cooperation control unit for performing cooperation control between a plurality of controllers and the cooperation adjustment unit for adjusting setting of the cooperation control performed by the cooperation control unit are provided. The cooperation control unit is set up functionally separately from the controllers for performing the behavior control of controlled objects in a vehicle, and the cooperation adjustment unit is set up functionally separately from the controllers. In other words, the hardware (i.e., a processor) of the cooperation control unit and the cooperation adjustment unit is not necessarily separate from the hardware (i.e., a processor) of the controllers. That is, for example, a part of the controller, a part of the cooperation control unit and a part of the cooperation adjustment unit may be implemented on the same processor. The processor in this case includes a CPU, a ROM, a RAM and the like.

By having the cooperation control unit and the cooperation adjustment unit as separate units, the cooperation control of the controllers is performed by the cooperation control unit, and adjustments of setting of the cooperation control by the cooperation control unit are collectively performed by the cooperation adjustment unit, thereby enabling the reduction of hardware and software in total in comparison to the configuration that provides cooperation control functions and cooperation adjustment functions in each of the controllers.

Further, addition and removal of the controllers to and from the communication system can be easily accommodated as well as the configuration change of the hardware/software of the controllers by the above configuration scheme. That is, for example, "Plug and Play" of the controllers is enabled in the vehicle control apparatus.

Furthermore, by only changing the vehicle type specific portion of the cooperation control setting, a generic vehicle control apparatus can be used in various vehicle types for adjusting the setting of the cooperation control.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the accompanying drawings.

First Embodiment

Figure 1:
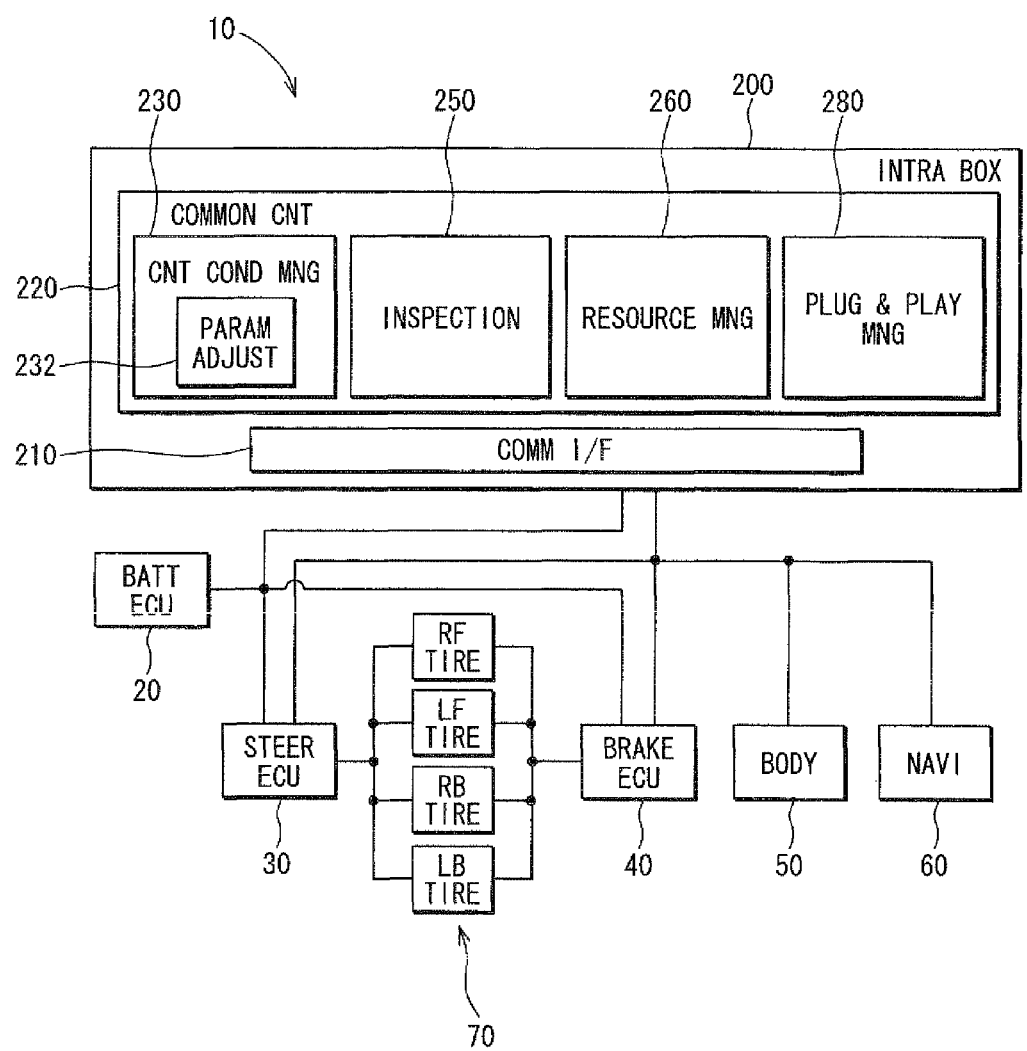
FIG. 1 is a block diagram of a vehicle control system in an embodiment of the present invention.

An embodiment of the present invention is explained as follows based on the drawing. A vehicle control system in one embodiment of the present invention is shown in FIG. 1.

(Vehicle Control System)

A vehicle control system 10 of the present embodiment includes a power control unit (Battery ECU) 20, a steering control unit (Steering ECU) 30, a brake control unit (Brake ECU) 40, a body control unit 50, a navigation apparatus 60, an intra box 200 and other parts. The steering control unit 30, the brake control unit 40, the body control unit 50, the navigation apparatus 60 are equivalent to a domain controller mentioned in claims, and the intra box 200 is equivalent to a vehicle control apparatus mentioned in claims. In addition, the intra box 200 is omitted from the drawings except for FIG. 1.

Figure 2:
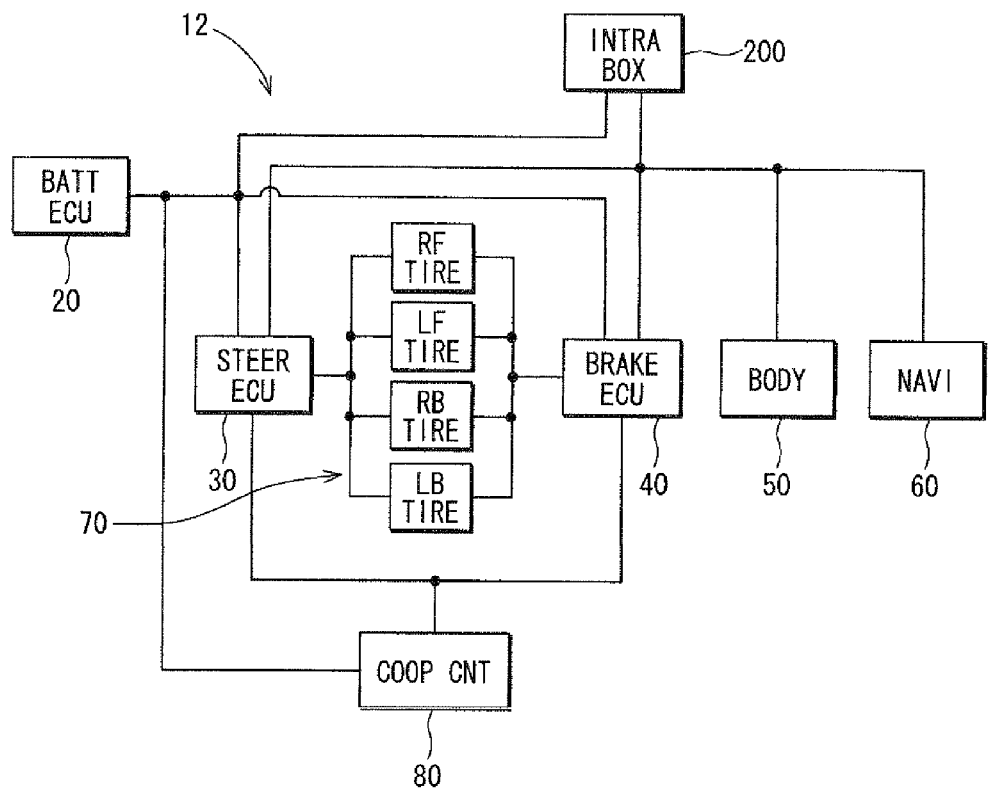
FIG. 2 is a block diagram of another vehicle control system.

As a vehicle control system, a cooperation control unit 80 controlling cooperation of the behavior control of the steering control unit 30 for tire 70 and the behavior control of the brake control unit 40 for the same control object of tire 70 may be installed as an example of a vehicle control system 12 as shown in FIG. 2. The cooperation control unit 80 controls the cooperation that depends on the behavior control of the steering control unit 30 and the behavior control of the brake control unit 40 both performed on the tire 70.

The power control unit 20 shown in FIG. 1 controls electric power provided for the steering control unit 30, the brake control unit 40, the cooperation control unit 80 and the intra box 200. A different power control unit controls electric power provided for the body control unit 50 and the navigation apparatus 60.

The steering control unit 30 controls a steerage angle of each tire 70 based on the detection signal from an angle detection sensor detecting a steered angle of the steering wheel. The brake control unit 40 controls an amount of braking of each tire 70 based on the detection signal of a sensor detecting brake pedal stepping amount.

The body control unit 50 controls the door of the vehicle, air conditioning and the like. The navigation apparatus 60 searches and guides an optimum travel route of a vehicle to a destination based on, for example, a satellite positioning system such as GPS and map data.

(Intra Box)

The intra box 200 includes a communication interface (I/F) unit 210 and a common control unit 220 with other functional unit. The common control unit 220 performs common control that is common to the steering control unit 30, the brake control unit 40, the body control unit 50 and the navigation apparatus 60 through the communication interface unit 210.

(Common Control Unit)

The common control unit 220 of the intra box 200 performs a plural number of the common controls that are extracted from the domain controller. The common controls are not dependent on the behavior control for a controlled object by the domain controller. The common control unit 220 includes a control condition management unit 230, an inspection unit 250, a resource management unit 260, a Plug & Play management unit 280 and other parts.

The control condition management unit 230, the inspection unit 250, the resource management unit 260 and the Plug & Play management unit 280 are all composed of a CPU, a ROM, a RAM, and a re-writable memory such as a flash memory and the like (not illustrated). The common control unit 220 performs infrastructure processing that is common to the domain controller.

To common control unit 220 preferably has a synchronization unit for coordinating synchronization for multiple common controls. By having the synchronization unit, the integrity of the behavior control in a vehicle is prevented from being damaged due to time-shift of use of information that is commonly used by multiple common controls extracted from the domain controllers.

(Control Condition Management Unit)

Figure 3:
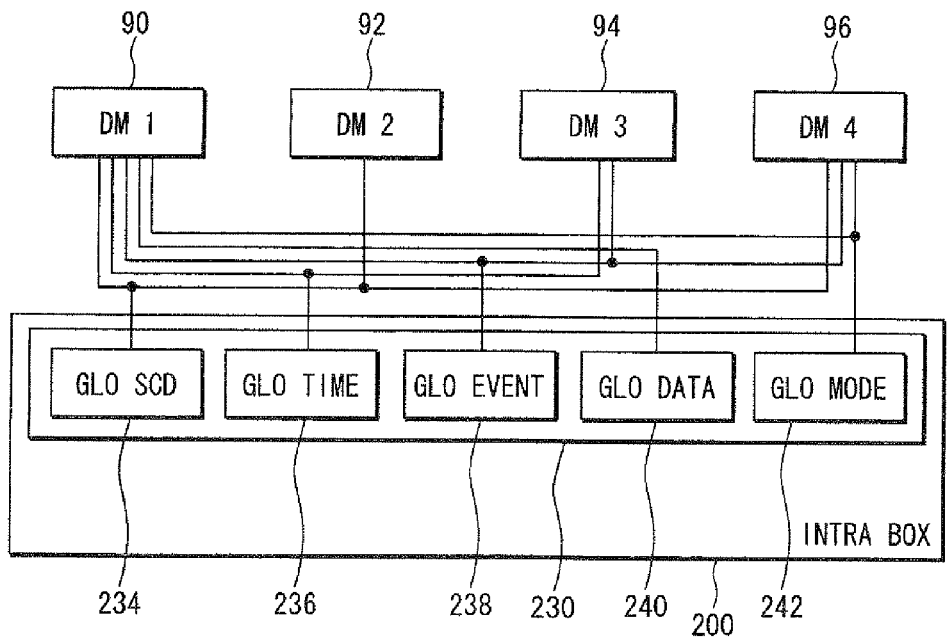
FIG. 3 is a block diagram of a configuration of a control condition management unit.

The control condition management unit 230 manages, as common control conditions for controlling the behavior of the controlled objects such as tire 70 or the like by domain managers 90, 92, 94, 96, a global schedule 234, a global time 236, a global event 238, global data 240 and a global mode 242 as shown in FIG. 3. The domain managers 90, 92, 94, 96 in FIG. 3 are equivalent to the domain controllers such as the steering control unit 30, the brake control unit 40, the body control unit 50, the navigation apparatus 60 and the like.

(Parameter Adjustment Unit)

The parameter adjustment unit 232 in FIG. 1 totally adjusts use of common parameters in the global schedule 234, the global time 236, the global event 238, the global data 240 and the global mode 242 commonly used by the domain managers 90, 92, 94, 96.

By the adjustments, the parameter adjustment unit 232 can easily coordinate use order of the common parameters by the domain managers 90, 92, 94, 96. As a result, the parameter adjustment unit 232 can prevent the competition of the common parameter by multiple domain managers. That is, when, for example, a use request of the common parameter that cannot be used simultaneously by two managers is issued by multiple domain managers, the competition of use of the parameter can be resolved by the adjustment unit 232.

Figure 4:
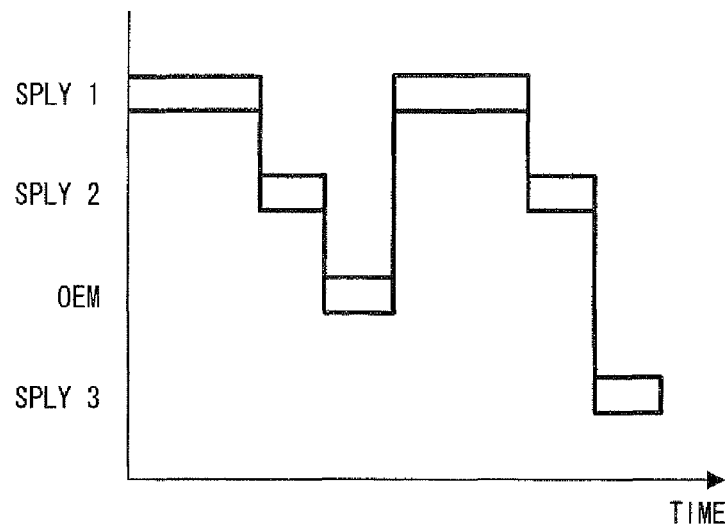
FIG. 4 is a time chart of a resource use schedule.

In addition, the parameter adjustment unit 232 may adjust the use of the common parameter in a time sharing manner as shown in FIG. 4. More practically, use of the common parameters for controlling the controlled object may be time-sliced for a functional unit of the behavior control by the domain managers 90, 92, 94, 96, that is, for each of a software suppliers of functional unit. In FIG. 4, suppliers 1, 2, 3, and a product of OEM (Original Equipment Manufacturer) are equivalent to the domain controller.

In addition, in the vehicle control system 12 having the cooperation control unit 80, as shown in FIG. 2, the parameter adjustment unit 232 adjusts the use of the common parameter without depending on the cooperation control of the cooperation control unit 80.

Figure 5:
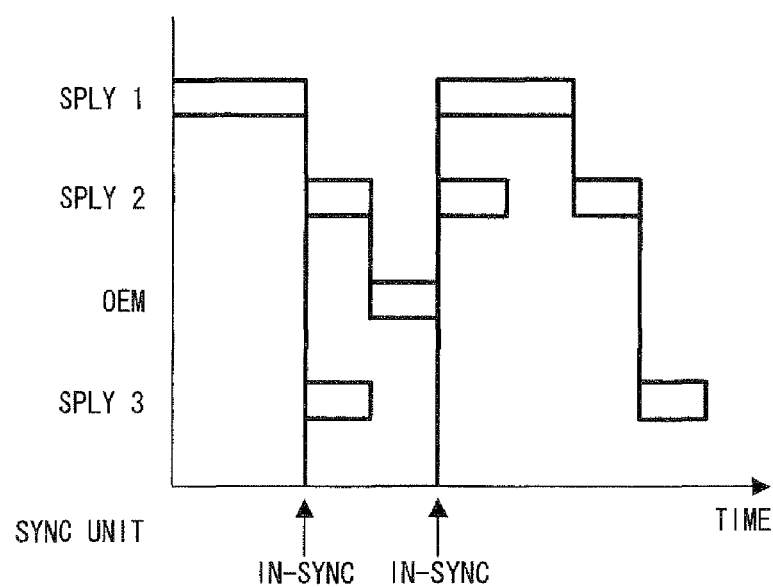
FIG. 5 is a time chart of another resources use schedule.
Figure 6:
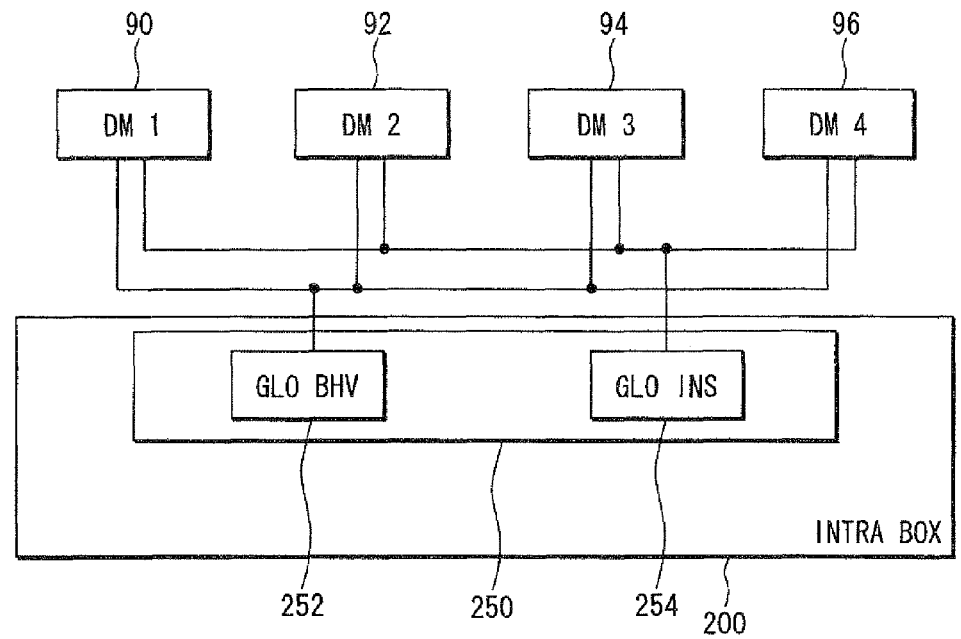
FIG. 6 is a block diagram of a configuration of an inspection unit.

In addition, the parameter adjustment unit 232 may adjust the synchronization of the domain managers 90, 92, 94, 96 or the synchronization of the cooperation control unit 80 and the domain managers 90, 92, 94, 96 when the common parameters are used. For example, in FIG. 5, the synchronization is adjusted when a use request for different common parameters are issued by the supplier 2 and supplier 3, or when a request for different common parameters are issued by the supplier 1 and supplier 2.

By the synchronization adjustment by the parameter adjustment unit 232 for an arrangement of use of the common parameters in a time-shifting manner along an axis of time scheduling, the integrity of the behavior control is prevented from being damaged due to use of the common parameters having different values between the domain managers 90, 92, 94, 96 in equal relations or between the cooperation control unit 80 and the domain managers 90, 92, 94, 96 that are in master servant relations.

Therefore, the synchronization adjustments by the parameter adjustment unit 232 are preferably optimized based on the use request of the common parameter. For example, by not performing the synchronization adjustments for the parameters that is not having the use request, electricity consumption and heat generation due to the adjustments can be minimized. In addition, the order of use of common parameters can be coordinated on demand based on the use request.

(Common Parameters)

The common parameters of the global schedule 234, the global time 236, the global event 238, the global data 240 and the global mode 242 are exemplified in the following description.

(1) Global schedule:

The usage period of CPU serving as an operation unit by the domain controller

The synchronization time when processing for the same data is required

CPU use order in a vehicle global when CPU serving as an operation unit is used by the domain controller CPU to be selected by the domain controller from among the multiple CPU serving as an operation unit (2) Global time:

The time for controlling the controlled object by the domain controller (3) Global event:

The opening and shutting of the door of the vehicle

Turning on of an ignition key

The change of vehicle states (modes) such as an accident detection, a theft detection or the like.

(4) Global data

An access address or a pointer of the common data shared by the domain controller (5) Global mode The travel modes such as energy saving travel and the like, and the vehicle state mode such as a vehicle-in-transport mode or the like.

(Inspection Unit)

The inspection unit 250 inspects abnormality of the behavior control of the domain managers 90, 92, 94, 96 for determining abnormality of a global behavior 252 of the vehicle from a viewpoint of the vehicle control system 10 and for diagnosing the cause of the abnormality by a global diagnosis 254.

The global behavior 252 is a behavior as a result of the behavior control by the multiple domain managers from among the domain managers 90, 92, 94, 96. In addition, the global diagnosis 254 diagnoses the cause of abnormality of the global behavior 252 based on the behavior control by the multiple domain managers.

(Resource Management Unit 260)

Figure 7:
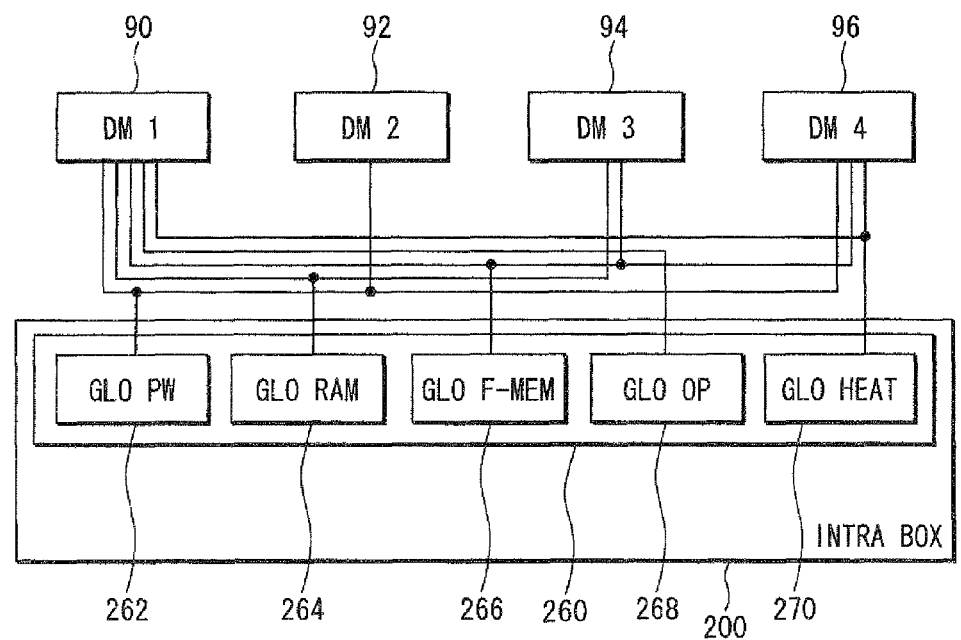
FIG. 7 is a block diagram of a configuration of the resource control unit.

The resource management unit 260 manages distribution, residue, storage, use restriction of a global electricity (power) 262, a global RAM 264, a global flash memory 266, a global operation unit 268, and a global heat 270 as shown in FIG. 7. The global electricity 262, the global RAM 264, the global flash memory 266, the global operation unit 268, and the global heat 270 are the resources that are shared by the domain managers 90, 92, 94, 96.

(Plug & Play Management Unit)

Figure 8:
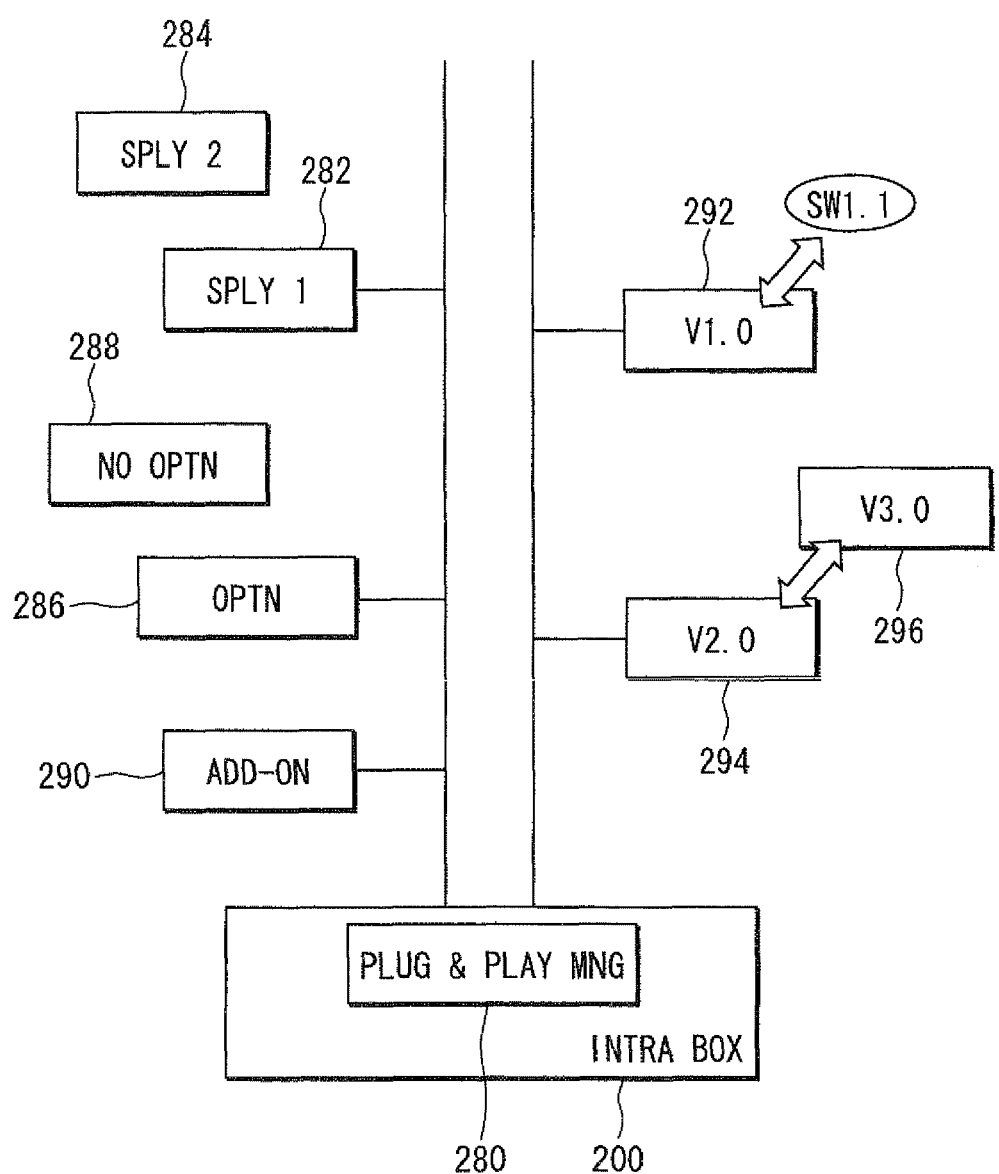
FIG. 8 is a block diagram of a configuration of a Plug & Play management unit.

The Plug & Play management unit 280 manages the system configuration of the vehicle control system 10 as shown in FIG. 8. In FIG. 8, numerals 282, 284, 286, 288, 290, 292, 294, 296 represent domain managers.

The Plug & Play management unit 280 detects difference of supplies (the supplier 1 and the supplier 2) between domain managers 282 and 284, use/none of options in domain managers 286, 288, adding of a domain manager 290 to the system, software (SW) update from Version 1.0 to Version 1.1 as a part of in a domain manager 292, replacement of a domain manager 294 in Version 2.0 to a domain manager 296 in Version 3.0 due to a bug or the like. The Plug & Play management unit 280 appropriately sets system communication protocol, the order of behavior control between the domain managers depending on a detected system configuration. By setting those conditions, the Plug & Play management unit 280 prevents a collision of the behavior control between the domain managers, and maintains consistency of the behavior control by the domain managers.

(Processing on Inspection Information from the Inspection Unit 250)

(1) The Control Condition Management Unit 230

It is desirable that the control condition management unit 230 performs management of control conditions based on an inspection result of the inspection unit 250. By restricting/stopping the behavior control by the domain controllers based on the inspection result, the control condition management unit 230 can reduce consumption of electricity; time and the like consumed by abnormal domain controllers as much as possible.

(2) The Resource Management Unit 260

It is desirable that the resource management unit 260 manages the use of resources by the domain controllers based on an inspection result of the inspection unit 250. By restricting or stopping the use of resources by abnormal domain controllers based on the inspection result, the resource management unit 260 secures the resource that can be distributed for other normal domain controllers.

(3) The Plug & Play Management Unit 280

It is desirable that the Plug & Play management unit 280 restricts the change of the system configuration by the domain controllers based on an inspection result of the inspection unit 250. That is, the Plug & Play management unit 280 can prevent the change of the system configuration that may cause abnormal behavior of the domain controller or may cause deterioration of the abnormal behavior.

(Processing on Resource Management Information from the Resource Management Unit 260)

(1) The Control Condition Management Unit 230

The behavior control by the domain controller is restricted or stopped by the control condition management unit 230 when a required resource amount for the domain controller can not be distributed based on the use condition of the resource managed by the resource management unit 260. By the above restriction, the consumption of electricity, time used by the abnormal domain controller can be reduced as much as possible.

(2) The Plug & Play Management Unit 280

The Plug & Play management unit 280 restricts the change of the system configuration by the domain controller based on the use condition of the resources which the resource management unit 260 manages. When the required resource amount can not be distributed to the domain controllers that are newly added or changed based on, for example, the use condition of resources, the Plug & Play management unit 280 restricts the addition and the change of the domain controller. As a result, the system can be configured in an optimized manner in terms of efficient use of the resources by the domain controller.

(Processing on System Management Information by the Plug & Play Management Unit 280)

The control condition management unit 230 manages the control condition based on the system configuration by the domain controller that is managed by the Plug & Play management unit 280. By the above management, the unnecessary behavior control of the domain controller is restricted or stopped based on the configuration of the vehicle control system 10 under control of the control condition management unit 230. As a result, electricity consumption and heat generation by the domain controller can be reduced.

(Processing on Inspection Information, Resource Management Information, System Management Information)

The control condition management unit 230 manages the control condition based on at least two items among the inspection information of the inspection unit 250, the resource control information of the resource management unit 260 and the system management information of the Plug & Play management unit 280. For example, the control condition management unit 230 appropriately performs the behavior control based on at least two items among the three items of information by setting priority and/or importance of the inspection information, the resource control information and the system management information in advance.

(Processing Based on Priority and Urgency of Use Request)

It is desirable for the resource management unit 260 to distribute resources according to the use request from the domain controller based on priority set for each of the domain controllers. By the above distribution, the behavior control by the high-priority domain controller can be carried out without delay due to the prioritized distribution of the required resources for the high-priority domain controller.

In addition, it is desirable for the resource management unit 260 to distribute resources for the domain controller according to the urgency of the use request from the domain controller. By the above distribution, the behavior control by the highly urgent use request from the domain controller can be carried out without delay due to the distribution of the required resources for the domain controller having the highly urgent use request.

(Independent Power Supply, Independent Information Storage Unit, Independent Operation Unit)

Figure 9:
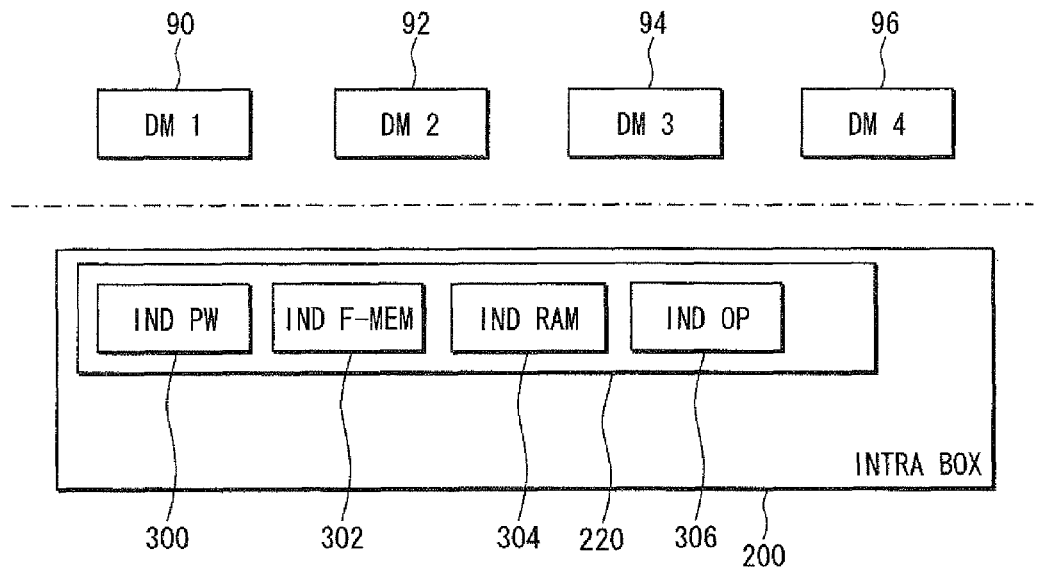
FIG. 9 is a block diagram of an independent information storage unit, an operation unit and a power supply.

The common control unit 220 preferably has an independent power supply 300 that is independent and exclusive from other devices such as the domain managers 90, 92, 94, 96 as shown in FIG. 9. In this manner, even if the other power supply is malfunctioning, the operation of the common control unit 220 can be continued. The independent power supply 300 may be commonly used by the units in the intra box 200.

Furthermore, it is desirable that the common control unit 220 has an information storage unit such as a flash memory 302 and an independent RAM 304 as well as an independence operation unit 306 that are independent and exclusive from the domain managers 90, 92, 94, 96. By having those devices, the deterioration of the process efficiency of the common control unit 220 by sharing of the operation means and information storage means with the domain managers 90, 92, 94, 96 is prevented. In addition, the operation of the common control unit 220 can be continued when malfunction occurs in other operation unit or the information storage unit.

Figure 10:
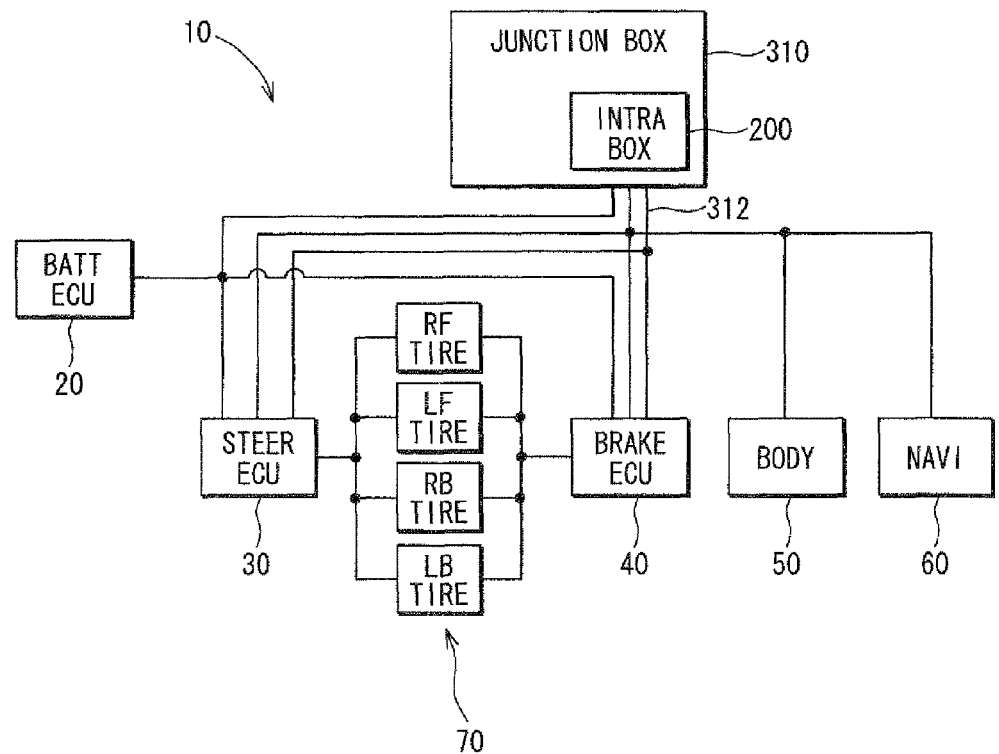
FIG. 10 is a block diagram of a configuration of an intra box installed in a junction box.

The intra box 200 may be installed in a junction box 310 that serves as a power control unit as shown in FIG. 10. By the above configuration, the intra box 200 can be installed on a vehicle without changing an existing device layout. In addition, the intra box 200 may be installed in a communication control unit such as a concentrator for use in a vehicle network instead of being installed in the junction box 310.

(Common Parameter Adjustment Routine)

Figure 11:
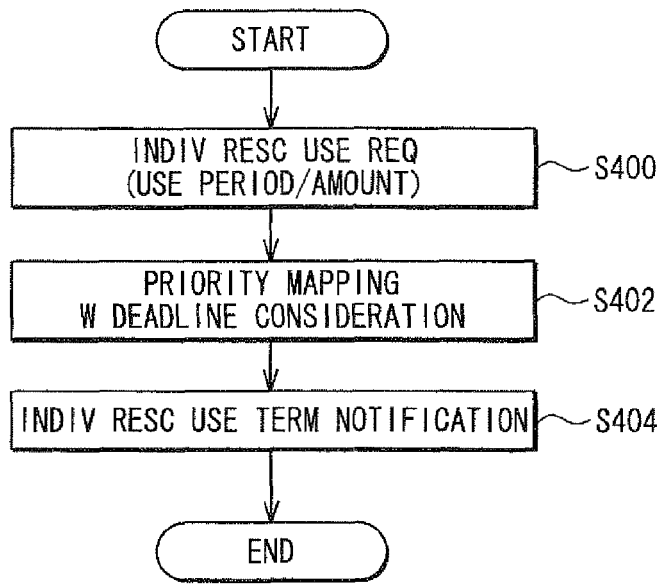
FIG. 11 is a flow chart of a common parameter adjustment routine.

A common parameter adjustment routine for scheduling resource use time, resource use period and the like upon receiving the use request for the resource as common parameters that is commonly used by the domain controllers is explained with reference to a flow chart in FIG. 11.

The intra box 200 accepts the use request such as the resource use period, the resource use amount for each of the resources in S400. Then, the intra box 200 considers the degree of emergency or the like such as the use priority set in advance in association to the domain controller or the processing deadline, and maps the use schedule of the resources on a time axis as shown in FIG. 4.

Figure 12:
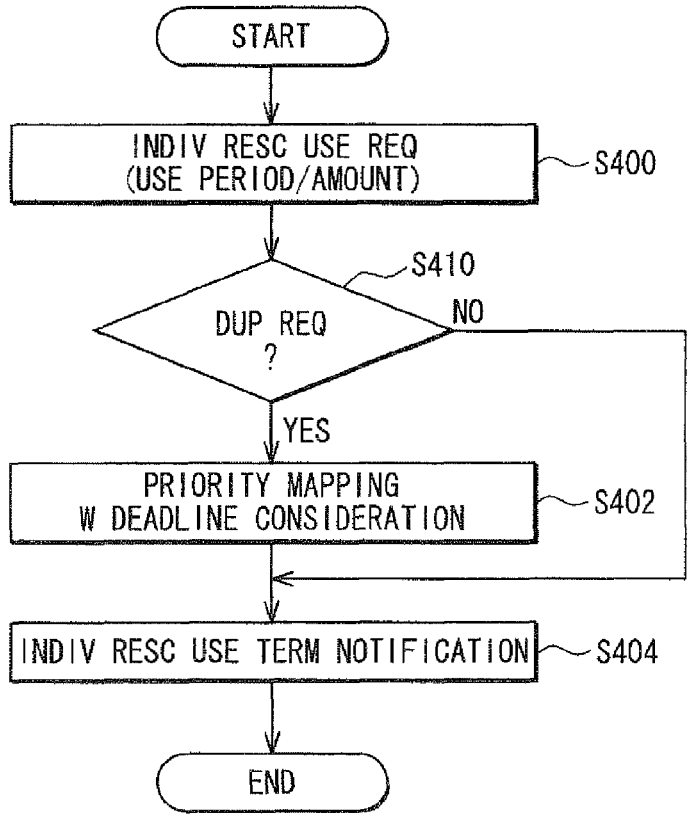
FIG. 12 is a flow chart of another common parameter adjustment routine.

Then, the intra box 200 notifies the domain controller about the use time and the use period according to scheduling set for each of the resources in S404. FIG. 12 is a flow chart showing another common parameter adjustment routine for scheduling resource use time, resource use period or the like upon receiving the use request for the resources. The substantially same step in FIG. 12 has the same step number as FIG. 11.

The resource may be having the use request from the multiple domain controllers in a duplicate manner, or may be having the use request from only one domain controller, depending on the type of the resource. Therefore, in S410, the intra box 200 determines whether the use request received in S400 is a use request for the same resource.

When the use request is duplicated, the intra box 200 considers the degree of emergency or the like such as use priority or the processing deadline, and maps the resource use schedule on the time axis in S402.

When the use request is not duplicated, the intra box 200 proceeds to S404 without executing S402. The intra box 200 can reduce electricity consumption and the consumption of processing time by omitting the mapping process on the time axis for the resources that do not have duplicated use requests from the multiple domain controllers.

The intra box 200 notifies the domain controller about the use time, the use period according to scheduling set for each of the resources in S404.

Second Embodiment

Figure 13:
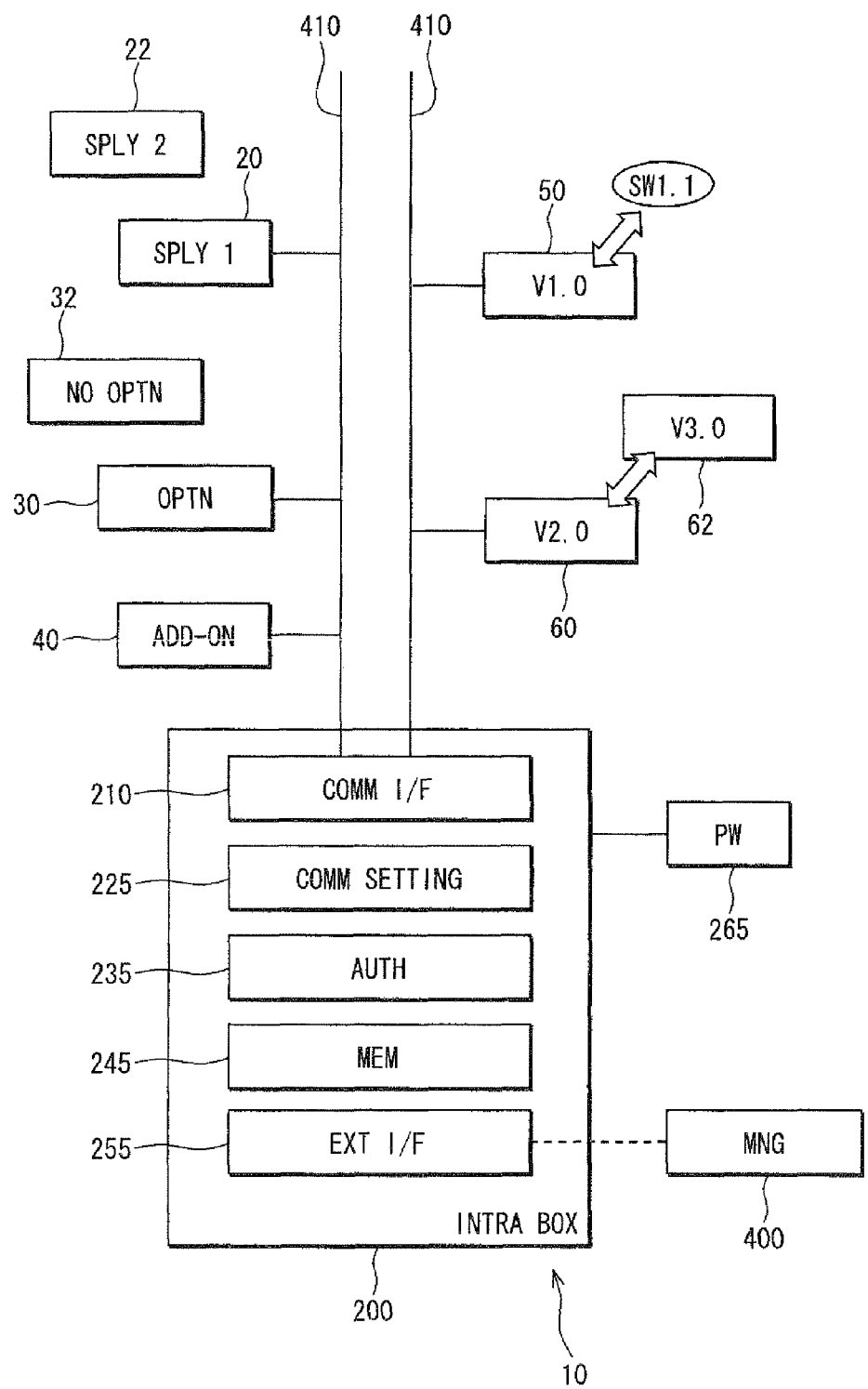
FIG. 13 is a block diagram that shows a vehicle control system in a second embodiment.

FIG. 13 shows a vehicle control system that uses a vehicle controller in the first embodiment of the present invention.

(Vehicle Control System)

A vehicle control system 10 is composed of controllers 20, 30, 40, 50, 60, an intra box 200, a power supply 265, a communication system 410 and the like, By connecting the controllers 20, 30, 40, 50, 60 and the intra box 200 together with the power supply 265, an in-vehicle LAN (Local Area Network) is composed.

The controllers (i.e., Electronic Control Unit; ECU) 20, 22, 30, 32, 40, 50 60, 62 are control devices that control the behavior of the controlled object installed in the vehicle. These controllers may be a device that individually controls each of the controlled objects, or may be a device that controls a function domain that is a bundle of functions or grouped functions such as a vehicle driving system, a braking system, or the like.

The controller 20 and the controller 22 have the same function with different suppliers. The controller 32 is a device that excluded an option part from the controller 30.

The controller 40 is a device that is not installed at the time of shipment. That is, the controller 40 is added to a vehicle after the shipment. The controller 50 is a device to which the version of a part of software (SW) can be updated from V1.0 to V1.1. The controller 62 is a device to be replaced with a controller 60 (a version 2.0) for an update to a version 3.0 in case that the device has some fault or the like.

The intra box 200 detects the change of the system configuration due to device replacement, adding of the device, update of the software and hardware or the like by using the communication system 410. Then, the intra box 200 adjusts the communication setting to the controller according to the detected system configuration.

The communication system 410 is a communication line in the in-vehicle LAN. The communication system 410 is formed as a single communication system having a uniform communication specification in the second embodiment. However, the in-vehicle LAN may have multiple communication systems disposed therein as described later. In that case, it is acceptable that the communication specification may be different in those multiple system.

(Intra Box)

The intra box 200 is composed of a communication interface unit 210, a communication setting unit 225, an authentication unit 235, a memory unit 245, an external interface unit 255, and the like. The intra box 200 corresponds to a vehicle control apparatus and more generic apparatus recited in claims. The communication interface unit 210, the communication setting unit 225, the authentication unit 235, the memory unit 245, and the external interface unit 255 are all composed of a CPU, a ROM, a RAM, and a non-volatile memory such as a flash memory or the like, which are not shown in the figure.

The processing device of the intra box 200 as hardware including the above-mentioned CPU, ROM, RAM, and the flash memory, and the like is composed as an independent processing device that is different from the controllers 20, 22, 30, 32, 40, 50, 60, 62. As a result, the operation of the intra box 200 such as an arithmetic calculation as well as storing, reading and writing of information can be continued even when the processing device in those controllers has some fault.

The power supply 265 is a power supply that is different from the power supply that provides electric power for the controller, and the electric power is supplied from the power supply 265 to the intra box 200 and the communication system 410. The management unit 400 is a device that diagnoses the vehicle control system 10 and, by interfacing with the external interface unit 255, performs the adjustment of the communication setting to the controller for communication with the communication interface unit 410 by way of the intra box 200. The management unit 400 has a volume of information that is greater than a volume of a communication setting information map memorized in the memory unit 245, and the communication setting information of the management unit 400 is always updated to the latest version. Therefore, the communication setting for the controller can be appropriately adjusted even if the controller that cannot be adjusted by the communication setting unit 225 is added to the communication system 410 after shipment.

Moreover, the management unit 400 can determine in full details the suitability of the addition of the controller to the communication system 410 that cannot necessarily be determined by the communication setting unit 225.

The intra box 200 functions as each of the following units by using control programs or the circuit configurations memorized in the storage such as the ROM, the flash memory and the like in the intra box 200.

(Communication Interface Unit)

The communication interface unit 210 is connected to the communication system 410. The intra box 200 sends and receives data to and from each of the controllers through the communication system 410

(Communication Setting Unit)

The communication setting unit 225 acquires combination information of the controllers that are connected to the communication system 410. That is, what kind of controllers are connected to the communication system 410 is acquired as information by the communication setting unit 225.

In addition it is desirable that product information such as a supplier of the connected controller, a software version, a hardware version, a controller request in response to the communication setting is acquired as the combination information by the communication setting unit 225 in terms of connection to the communication system 410. The communication setting unit 225 acquires the combination information either by an inquiry to the controllers when the controllers are connected to the communication system 410, or by a notification from the controllers upon connection of the controllers to the communication system 410.

The communication setting unit 225 adjusts the communication setting for the controller according to the acquired combination information of the controller. The adjustments of the communication setting means the adjustments of priority level of the communication among the controllers as well as the adjustments of controller of receiving end of the communication and communication data order arrangement and the like according to the combination of the controllers connected to the communication system 410.

Moreover, the communication setting unit 225 adjusts the communication setting of common devices that are commonly used among a variety of the vehicle control systems due to a variety of the vehicle types, intra boxes, or a variety of connected controllers in the same vehicle type. In this manner, a general purpose controller can be easily installed in various types of vehicle.

Further, the communication setting unit 225 preferably determines the suitability addition of the controllers to the communication system 410 based on the acquired product information of the controllers. For example, the communication setting is not performed for the controller that does not respond to the inquiry, and the connection of the controller to the communication system 410 is prohibited in that case.

Furthermore, the communication setting unit 225 can perform an appropriate operation such as refusal of connection of an updated controller to the communication system when the update of the software/hardware of the controller is not in synchronization with the update of the other controllers. That is, when inconsistency of vehicle control due to the version un-match of software/hardware is expected, the connection of the updated controller will not be allowed.

Furthermore, the communication setting unit 225 may transmit the communication setting information to the controller. The controller can voluntarily perform a communication setting necessary to communicate on the communication system 410 based on the communication setting information transmitted from the communication setting unit 225. As a result, the load of the communication performed between the controller and the communication setting unit 225 for the adjustment of the communication setting of the controller can be reduced.

It is desirable that the communication setting unit 225 transmits connection procedure, connection timing of the communication system 410 as well as disconnection procedure and disconnection timing from the communication system 410. In this manner, the time of connection of the controller to the communication system 410 can be shortened as much as possible. As a result, the communication load, power consumption, and generation of heat of the controller can be reduced.

The communication setting unit 225 is installed independently from the controllers, and performs the adjustments of the communication setting for each of the controllers connecting to the communication system 410 in a unified manner. Therefore, there is no need to have a communication setting adjustment function in each of the controllers. As a result, the amount of hardware and the amount of software that are required for the communication setting adjustment functions can be reduced.

Furthermore, because the communication setting unit 225 that is functionally independent from the controllers performs the adjustments of the communication setting for the controller, the communication setting unit 225 can perform the adjustments of the communication setting for the controller in association with the connection/disconnection of the controller, replacement of the software/hardware of the controller and the like without an involvement of the functions of the controller. Therefore, 'Plug and Play' of the controller can be realized by using the intra box 200 in the vehicle.

Furthermore, by only adjusting a vehicle type specific portion of the communication setting for the controller, for example, the intra box 200 for general purposes can be easily used for the adjustments of the communication setting according to each of the vehicle types.

(Authentication Unit)

The authentication unit 235 determines the suitability of the controller that is connected to the communication system 410. The authentication unit 235 does not permit the connection of the controller to the communication system 410 if the controller is an un-authorized/illegal device. For instance, the authentication unit 235 having a list of authentication numbers of the controllers does not permit the connection of the controller if the authentication number of the controller is not listed. The connection to the communication system 410 is permitted when the authentication number of the controller is found in the list in the authentication unit 235.

(Memory Unit)

The memory unit 245 memorizes the communication setting for the controller as a map on the basis of the combination information of the connectable controllers for each of the vehicle types. The communication setting information map is prepared as a single piece for each of the vehicle types, or as multiple pieces for each of the vehicle types. The communication setting unit 225 selects and switches the maps according to the combination information of the controllers, and adjusts the communication setting for the controller that is connected to the communication system 410 on the basis of the map.

Thus, the communication setting for the controller can be easily adjusted by memorizing the combination information of the controllers that is connected to the communication system 410 in two or more maps beforehand on the basis of the map.

(External Interface Unit)

The external interface unit 255 establishes the interface for connection to the management unit 400.

Explanations of communication setting adjustment routines 1 to 5 by the intra box 200 is provided with reference to FIGS. 14 to 18. In each of the routines, 'S' represents 'step.'

(Communication Setting Adjustment Routine 1)

Figure 14:
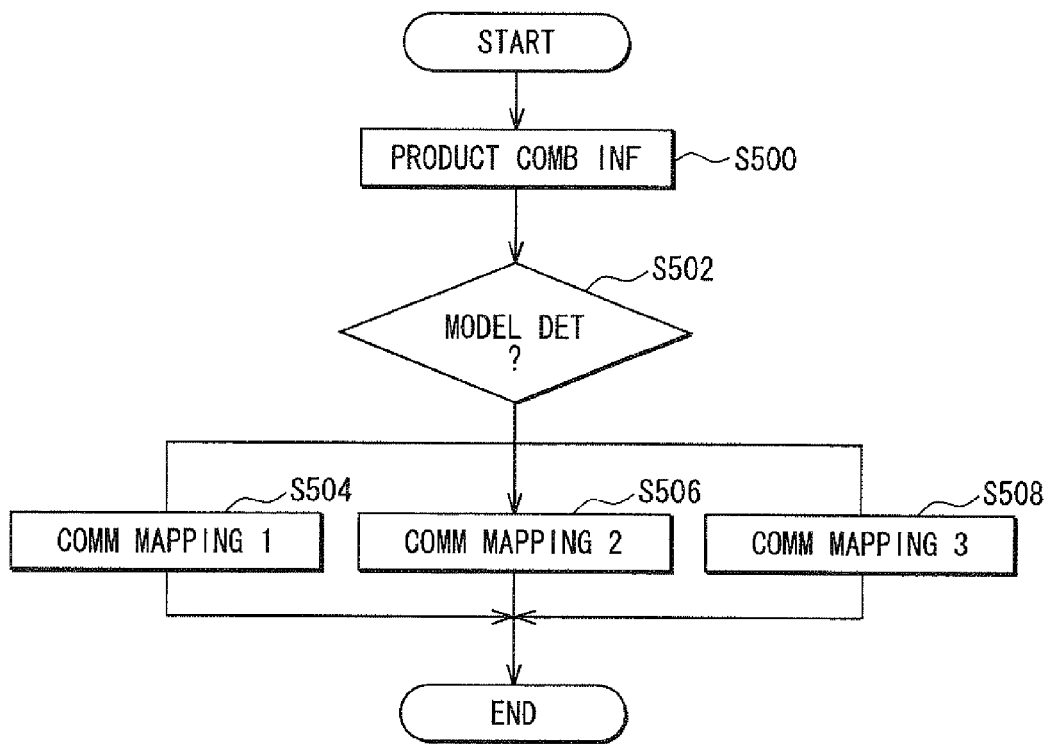
FIG. 14 is a flow chart that shows a communication setting adjustment routine 1.

The communication setting adjustment routine 1 shown in FIG. 14 is executed at a time of turning-on of the ignition key while the vehicle control system is initialized if the adjustment of the communication setting is 'processable,' that is, if the communication setting adjustment can be processed in a short time. In this case, 'the short time' means, for example, a period of request from the management unit 400, a period of switching maps or the like. The communication setting adjustment routine 1 is executed, if the adjustments requires a longer period of time, while the vehicle control system is in a termination process at a time of turning-off of the ignition key after the needs for adjustments of the communication setting is recognized at the time of turning-on of the ignition key.

The intra box 200 detects the controller that is connected to the communication system 410, and acquires the combination information of the connected controllers by the notification from the controller or the inquiry to the controller in S500.

The intra box 200, then, determines the vehicle type in S502 on the basis of the combination information of the controller. Further, the intra box 200 switches and selects the communication setting information map corresponding to the vehicle type from the communication setting information maps memorized in the memory unit 245, and adjusts the communication setting of the controller on the basis of the selected communication setting information map (S504, S506, S508).

The communication setting of the controller can be easily adjusted by a simple processing of switching the communication setting information maps according to the combination information of the controller. The communication setting information map is not limited to one piece for one vehicle type. That is, there may be multiple pieces of maps for the controllers connected to the communication system 410 for instance.

(Communication Setting Adjustment Routine 2)

Figure 15:
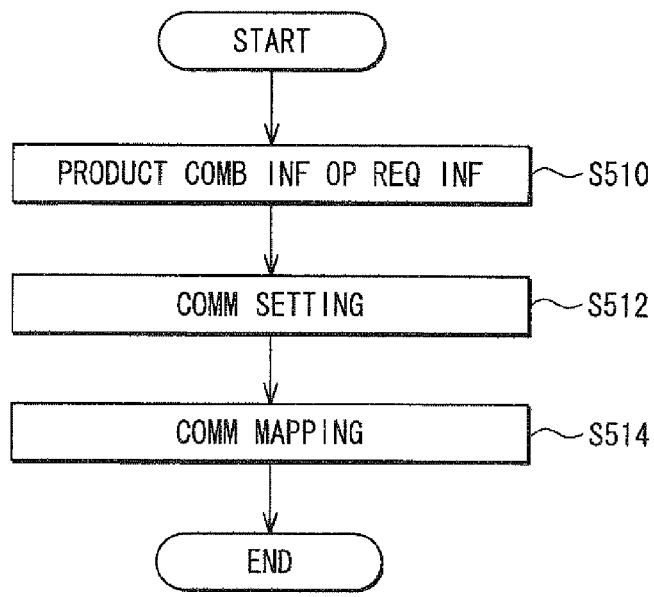
FIG. 15 is a flow chart that shows a communication setting adjustment routine 2.

The intra box 200 may execute a communication setting adjustment routine 2 shown in FIG. 15 in place of the communication setting adjustment routine 1 in FIG. 14.

The communication setting adjustment routine 2 shown in FIG. 15 does not memorize the communication setting information map of each vehicle type in the memory unit 245 as the communication setting adjustment routine 1 of FIG. 14 does. The adjustment routine 2 is a routine that adjusts the communication setting of the controller according to the combination information of the controller.

The intra box 200 detects the connected controllers in the communication system 410, and acquires the combination information of the controller, and then accepts the request of the communication setting from the controller in S510. The communication setting requested from the controller includes, for example, a communication priority level, a transmission delay time and the like.

The intra box 200 performs the adjustments of the communication setting of the controller in S512 based on the combination information of the controller and the communication setting request from the controller. Then, the intra box 200 adjusts the communication setting on the basis of the combination information of the controller and rewrites the communication setting information map on the basis of the adjusted communication setting information in S514 in the adjustment routine 2, instead of employing the preset information maps of each vehicle type. In a word, there is only one communication setting information map.

As a result, there is no need to store multiple communication setting information maps for the adjustments of the communication setting. Therefore, the storage amount of the memory unit 245 can be reduced. Moreover, the communication setting can be flexibly adjusted according to the combination information, thereby enabling an easy accommodation of the configuration change of the connected controller on the communication system 410.

In this case, re-configuration of the entire communication setting may take a longer time. Therefore, an expected re-configuration area may be set in advance for each vehicle type for reducing the re-configuration setting time.

(Communication Setting Adjustment Routine 3)

Figure 16:
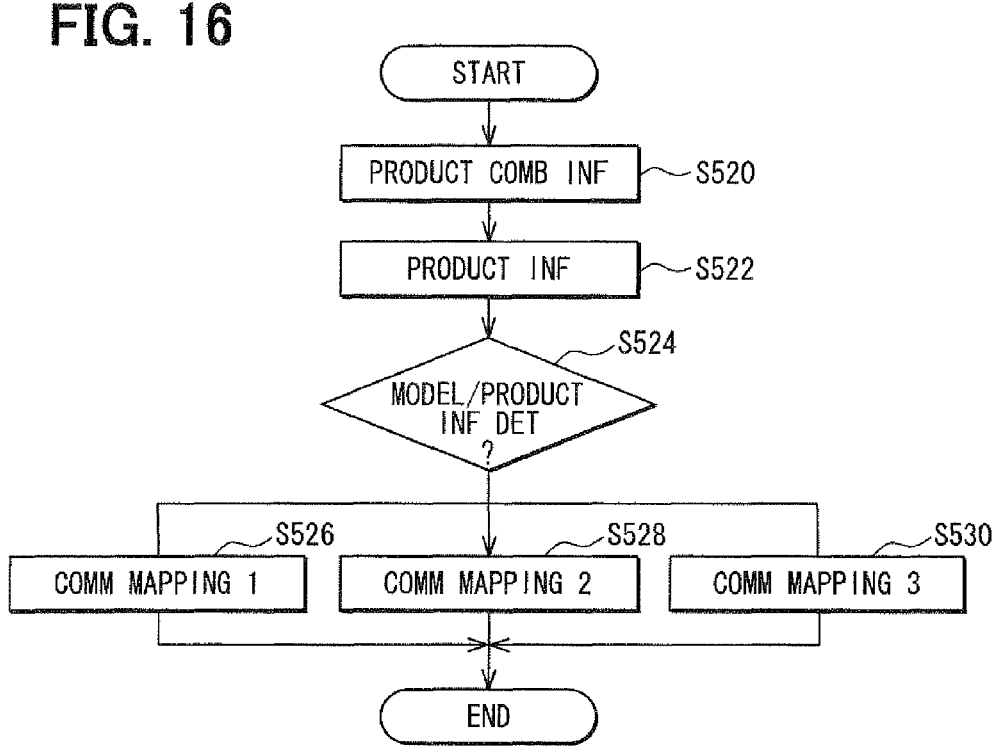
FIG. 16 is a flow chart that shows a communication setting adjustment routine 3.

The intra box 200 may execute a communication setting adjustment routine 3 shown in FIG. 16 in place of the communication setting adjustment routine 1 of FIG. 14.

The intra box 200 detects the connected controller on the communication system 410, and acquires the combination information of the controller in S520. In addition, the intra box 200 acquires the product information such as a version of software, a version of hardware (e.g., a product number), and a supplier in each controller as the combination information of the controller in S522.

Then, the intra box 200 determines in S524 the vehicle type and adjustment condition of the communication setting on the basis of the combination information of the controller including the product information acquired in S520 and S522.

Then, the intra box 200 switches and selects the communication setting information map from the communication setting information maps memorized in the memory unit 245 in accordance with the vehicle type and the adjustment conditions based on the product information, and performs the adjustment of the communication setting of the controller based on the selected communication setting (S526, S528, S530).

(Communication Setting Adjustment Routine 4)

Figure 17:
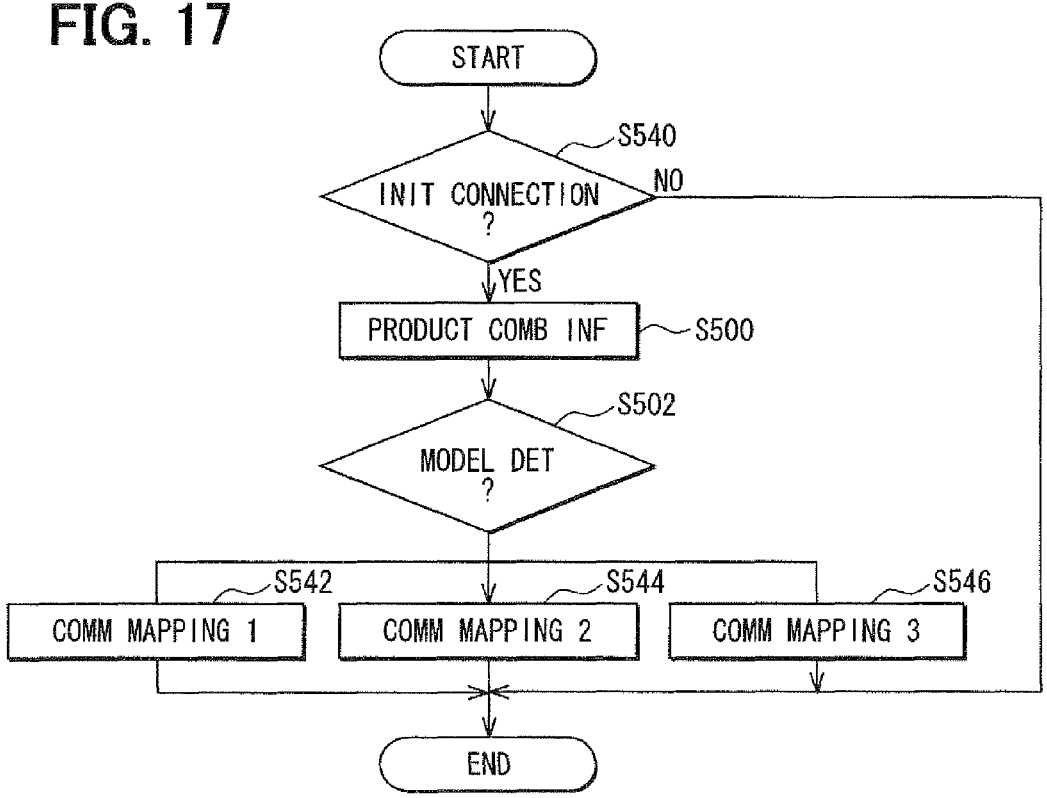
FIG. 17 is a flow chart that shows a communication setting adjustment routine 4.

The intra box 200 determines in S540 whether the adjustment of the communication setting is performed for the first time in a communication setting adjustment routine 4 in FIG. 17. If the adjustment is not the first time (S540; NO), the intra box 200 finishes the execution of the present routine 4, and executes the communication setting adjustment routine 1.

If the adjustment is the first time (S540:Yes), the intra box 200 acquires the combination information of the controller (S500), and determines the vehicle type based on the acquired combination information (S502).

Then, the intra box 200 switches and selects the communication setting information map in accordance with the vehicle type from the communication setting information maps memorized in the memory unit 245, and performs the adjustments of the communication setting of the controller on the basis of the selected communication setting information map (S542, S544, S546). When the adjustment of the communication setting is performed for the first time in S542, S544, and S546, the intra box 200 adjusts the communication setting of the controller that contains the common device that is commonly used among a variety of vehicle types, intra boxes, or a variety of connected controllers in the same vehicle type.

Thus, a general purpose controller for common use in various vehicle types and various intra boxes can be easily and efficiently configured by performing the communication setting of the common device in the first adjustment of the communication setting. As a result, the general purpose controller can be easily installed in various vehicle types.

(Communication Setting Adjustment Routine 5)

Figure 18:
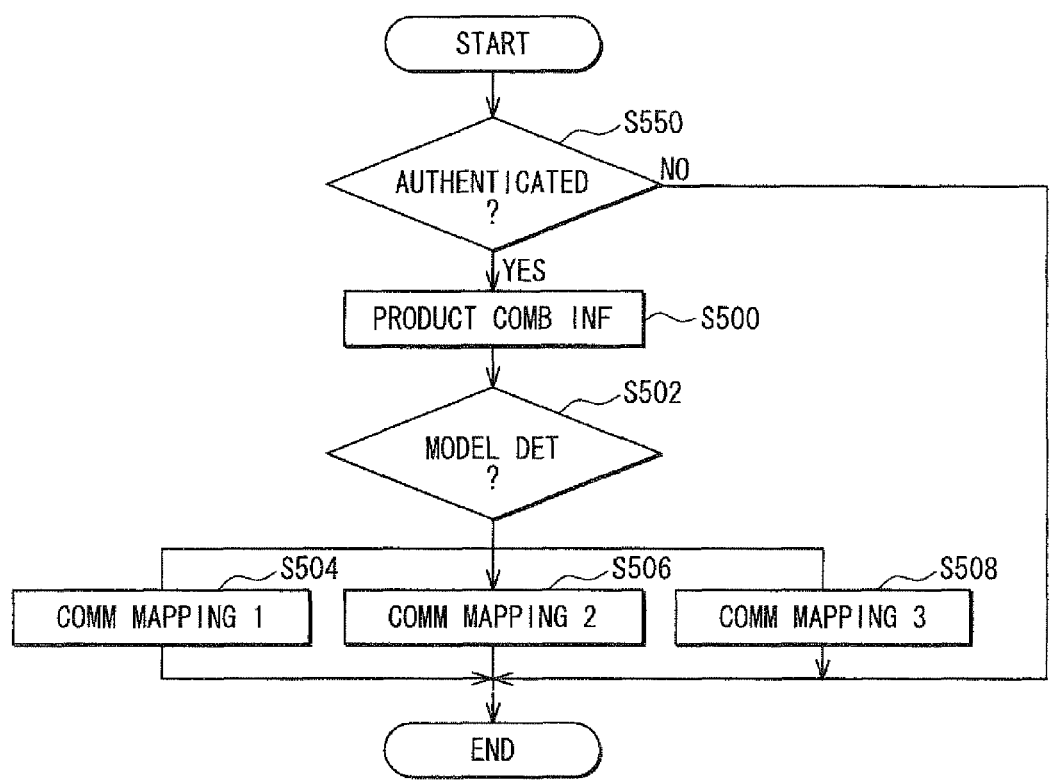
FIG. 18 is a flow chart that shows a communication setting adjustment routine 5.

The intra box 200 may execute a communication setting adjustment routine 5 shown in FIG. 18 in place of the communication setting adjustment routine 1 of FIG. 14.

The intra box 200 performs an authentication determination of the controller that is connected to the communication system 410 in S550 in the communication setting adjustment routine 5 in FIG. 18. The intra box 200 permits the connection to the communication system 410 only to the controller that has connection authentication to the communication system 410 (S550: YES=authenticated), and executes processing similar to the communication setting adjustment routine 1 of FIG. 13 after S500.

The intra box 200 does not permit the connection to the communication system 410 to the controller that does not have connection authentication to the communication system 410 (S550:NO=not authenticated). Then, the intra box 200 ends the present routine without adjusting the communication setting for the controller that has not been authenticated.

Third Embodiment

Figure 19:
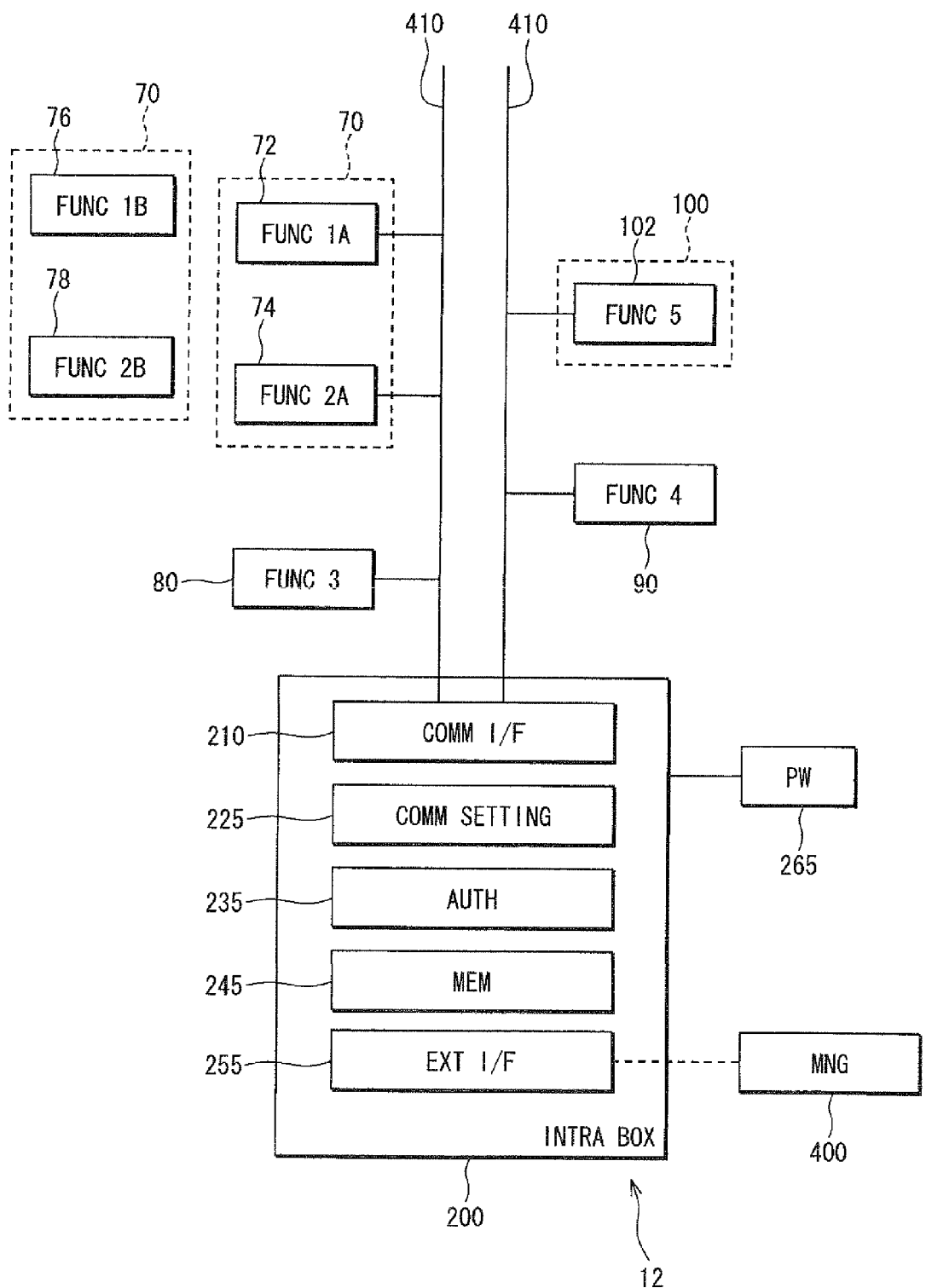
FIG. 19 is a block diagram that shows a vehicle control system in a third embodiment is shown.

FIG. 19 shows a vehicle control system in the third embodiment of the present invention. Like reference numbers are attached to like parts as the second embodiment.

In a vehicle control system 12 of the present embodiment, a controller 72 having a function 1A and a controller 74 having a function 2A form a function group in terms of cooperative relevance of behavior control of the vehicle. That is, two of the controllers 72, 74 either realize one function, or belong to the same suppliers or belong to the same function group that is commonly used in various vehicle types, thereby composing an object 70 in this case. For instance, the controller 72 is an engine ECU, and the controller 74 is a transmission control ECU. Due to tight coupling of cooperation control of the vehicle behavior performed by the controller 72 and the controller 74, the controllers 72, 74 form an 'object.' Further, when the controller 76 that achieves a similar function 1B to the function 1A as an engine ECU is used in place of the controller 72, and the controller 78 that achieves a similar function 2B to the function 2A as a transmission control ECU is used in place of the controller 74, the controller 76 and the controller 78 form the object 70. The communication setting unit 225 does not change the communication setting for the object 70 even if the controller that composes same the object 70 is replaced.

The communication setting for the object 70 is a communication timing, a communication slot, and the like that fulfill the limiting conditions such as an allowable delay time, a processing order, information freshness, and the like allocated, as requirements, for the object 70. When the controller is replaced, information arrangement and priority as well as information contents that are used in the communication in the allocated resource may be set for each of the combination of the functions, that is, for the combination of functions 1A and 2A, and for the combination of functions 1B and 2B.

The communication settings of the controllers 80 and 90 are adjusted in the communication system 410 by the communication setting unit 225 in an optimized manner whenever the controllers 80 and 90 are used, because the controller 90 achieving a function 3 and the controller 80 achieving a function 4 are not handled as an 'object.'

On the other hand, the controller 102 that achieves a function 5 composes an object 100 as a single controller. Therefore, when other controllers are used in place of the controller 102 to achieve the function 5, other the other controllers compose the object 100. The communication setting unit 225 does not change the communication setting for the controller that achieves the function 5. The communication setting mentioned above in association with the controller 102 is similar to the contents described for the object 70.

Thus, the adjustment load of the communication setting by the communication setting unit 225 is reduced compared with the case that adjusts the communication setting according to the controller, because the communication setting unit 225 does not change the communication setting for the object. Moreover, the above scheme of setting operation makes it easy to replace the controller or easy to add functions in the object. In addition, because information stability, processing stability as well as cooperative processing speed are guaranteed in the object, the Plug and Play of the controller that requires higher safety standard becomes feasible.

Moreover, it is desirable that the communication setting unit 225 acquires, as the combination information, the product information such as the version of the object in addition to acquiring the supplier, the version of the software, and the version of the hardware of the controller connected to the communication system 410 as well as the request from the controller for the communication setting and the like. The communication setting unit 225 may acquire the combination information either by an inquiry to the controllers when the controllers are connected to the communication system 410, or by a notification from the controllers that is connected to the communication system 410. The communication setting unit 225 adjusts the communication setting for the object on the basis of the acquired version of the object.

Further, the communication setting unit 225 can perform appropriate operation such as refusal of connection of an updated controller to the communication system when an update of the object/controller is not in synchronization with the update of the other objects/controllers. That is, when inconsistency of vehicle control due to the version un-match between the controllers, objects or between the object and the controller not-yet handled as an 'object' is expected, the connection of the updated object to the communication system may not be allowed.

Fourth Embodiment

Figure 20:
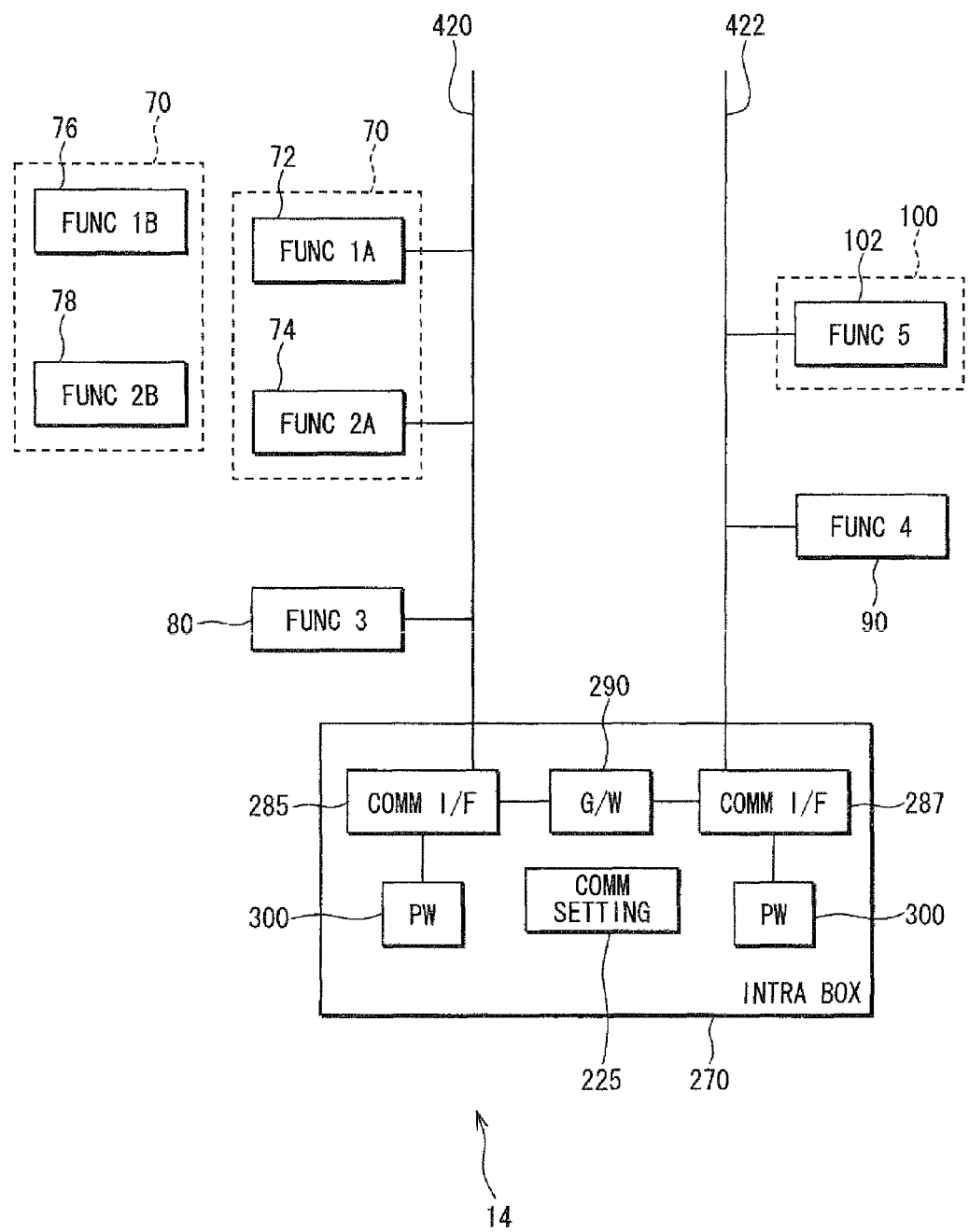
FIG. 20 is a block diagram that shows the vehicle control system in a fourth embodiment.

FIG. 20 shows the vehicle control system in the fourth embodiment of the present invention. Like reference numbers are attached to like parts as the third embodiment.

In FIG. 20, the authentication unit 235, the memory unit 245, and the external interface unit 255 are omitted from an intra box 270.

In a vehicle control system 14 of the present embodiment, communication interface units 285, 287 are connected respectively to two communication systems 420, 422. A gateway 290 mediates the communication data of the communication system 420 and the communication system 422. Moreover, the electric power is supplied respectively to the communication interface units 285, 287 and the communication systems 420, 422 from a power supply 300 that is different from the power supply that supplies electric power to the controllers.

Communication specifications of the communication systems 420, 422 may be same, or may be different depending on the design requirement of the vehicle control system. When the communication specifications of the communication systems 420, 422 are different, each of the controllers connects to either of the communication systems 420, 422 that accord with its own communication specification.

When the communication specification of both communication systems 420, 422 is same, the controller preferably selects the connection to the communication system based on the load of the communication and the closeness of the cooperation control between the controllers. As a result, the communication system 420, 422 can appropriately connect the controller to the communication systems 420, 422 in consideration of the communication load and the closeness of the cooperation control between the controllers.

In the fourth embodiment, because the electric power is supplied to each of the combinations, that is, to a combination of the communication system 420 and the communication interface unit 285 and to a combination of the communication system 422 and the communication interface unit 287, from the independent power supply 300 that is different from the power supply for providing electric power to the controllers, the communication is established through the communication systems 420, 422 regardless of the start or the stop of the controllers.

Moreover, because the electric power is supplied from the power supplies 300 that are different for each of the combinations, the communication is established through the combination of the communication system and the communication interface unit having the electric power supplied from different power supply.

Fifth Embodiment

Figure 21:
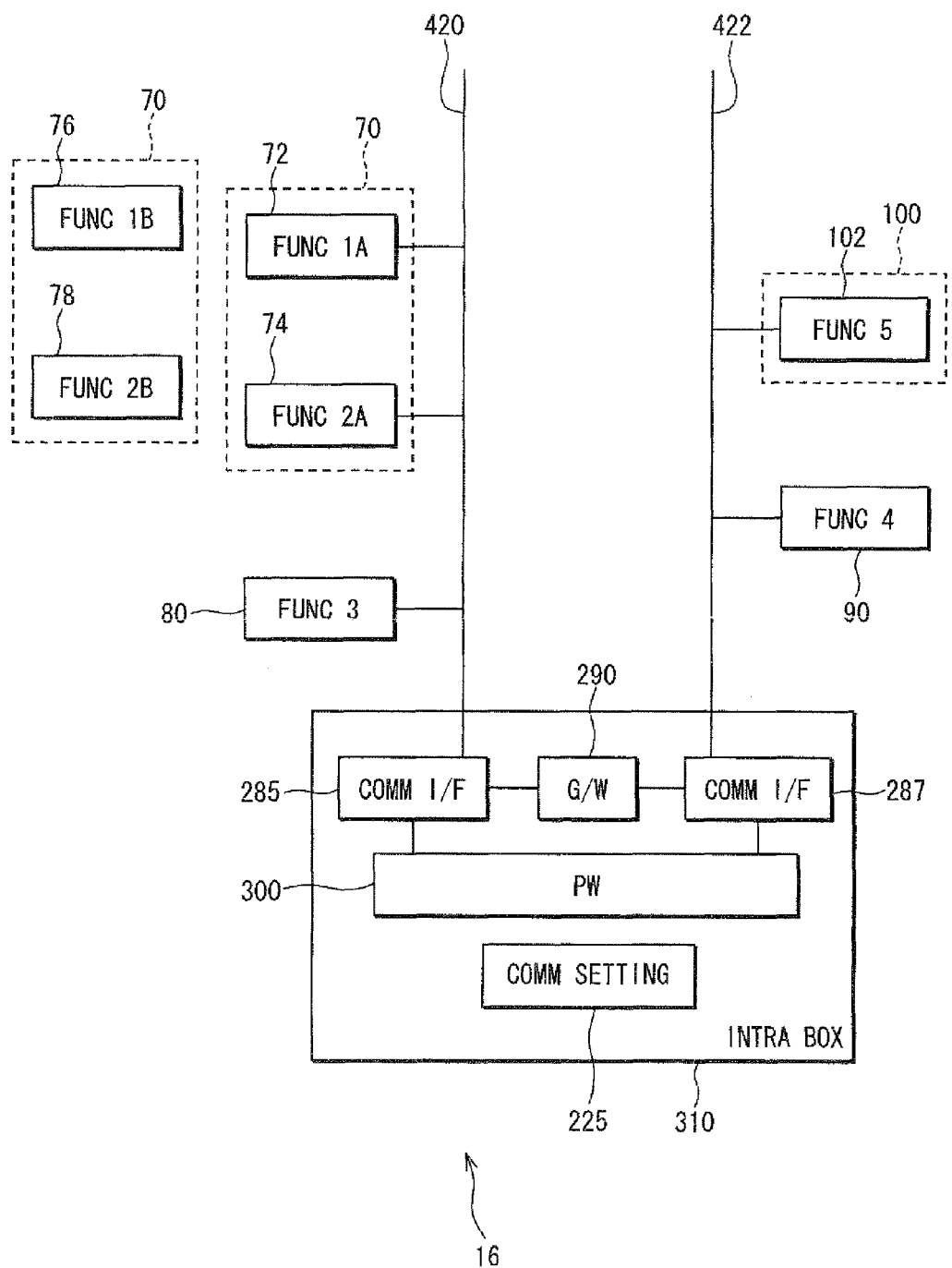
FIG. 21 is a block diagram that shows the vehicle control system in a fifth embodiment.

FIG. 21 shows a vehicle control system in the fifth embodiment of the present invention. Like reference numbers are attached to like parts as the second embodiment.

In FIG. 21, the authentication unit 235, the memory unit 245, and the external interface unit 255 are omitted from an intra box 310.

In vehicle control system 16 shown in FIG. 21, information is shared by the communication system 420 and the communication system 422, and the cooperation of the controllers connected to each of the two communication systems, that is, in this case, the cooperation of the controller 80 and the controller 102, performs single vehicle behavior control. Therefore, the vehicle behavior cannot be controlled if only one of the other communication systems is operated. In this case, both of the communication specifications 420, 422 may have same communication specification or respectively different communication specification depending on the design requirement.

Therefore, the electric power is supplied from a common power supply 300 to both of the communication systems 420, 422 and both of the communication interface units 285, 287 in a vehicle control system 16 in the present embodiment. As a result, an insufficient vehicle behavior control is prevented due to the power supply only to one of the two communication systems resulting in the use of only one of the two communication systems.

Sixth Embodiment

Figure 22:
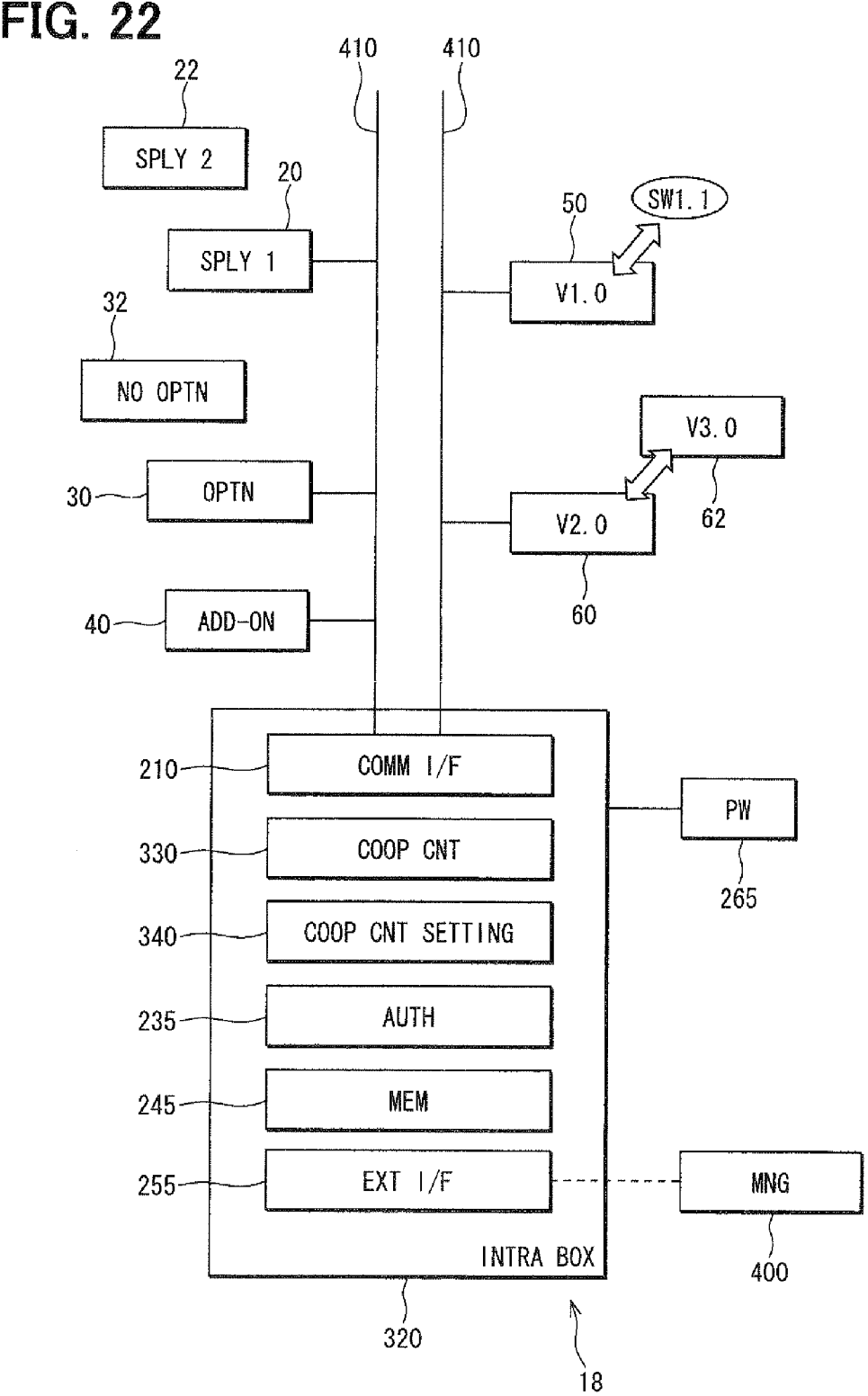
FIG. 22 is a block diagram that shows the vehicle control system in a sixth embodiment.

FIG. 22 shows a vehicle control system in the sixth embodiment of the present invention. Like reference numbers are attached to like parts as the second embodiment.

In a vehicle control system 18 of the present embodiment, an the intra box 320 as a vehicle controller is composed of the communication interface unit 210, a cooperation control unit 330, a cooperation control setting unit 340, the authentication unit 235, the memory unit 245, and the external interface unit 255, and the like.

The intra box 320 detects the change of the system configuration such as replacement of the controller that is provided by a different supplier from the original one, addition of the controller, update of the software and the product and the like by using the communication system 410. Then, the intra box 320 adjusts the setting of a cooperation control for the controllers that jointly control the behavior of the controlled object installed in the vehicle according to the detected system configuration.

The management unit 400 of the present embodiment executes the adjustment of the setting of a cooperation control for the controllers by the cooperation control unit 330 through a connection to the external interface unit 255. The management unit 400 has a greater volume of information of the setting of a cooperation control in comparison to the cooperation control setting information map memorized in the memory unit 245, and the cooperation control setting information of the management unit 400 is always updated to the latest version. Therefore, the setting of a cooperation control for the controllers can be appropriately adjusted even if a controller that cannot be controlled by the cooperation control setting unit 340 is connected to the communication system 410.

Moreover, the management unit 400 determines, even when the cooperation control setting unit 340 cannot determine the suitability, the suitability of the controller to which the cooperation control unit 330 executes a cooperation control in greater details than the cooperation control setting unit 340.

Next, the cooperation control unit 330, the cooperation control setting unit 340, the authentication unit 235, and the memory unit 245 in the intra box 320 are described.

(Cooperation Control Unit)

The cooperation control unit 330 controls the cooperation of the controllers that control the behavior of the same controlled object, for example, the same tire. That is, the cooperation of the controllers such as a steering controller and a brake controller controlling the same tire is controlled by the control unit 330.

(Cooperation Control Setting Unit)

The cooperation control setting unit 340 acquires information regarding the combination of the controllers under the cooperation control by the cooperation control unit 330. That is, what kind of the controllers are under the cooperation control performed by the cooperation control unit 330 is acquired by the cooperation control setting unit 340.

In addition, it is desirable for the cooperation control setting unit 340 to acquire the version of the object as described in the third embodiment in addition to acquiring, as the combination information, the product information such as the supplier of the controller that performs the cooperation control, the version of the software, the version of the hardware, and the request of the controller in response to the setting of the cooperation control (not shown in the drawing), The combination information and the version of the object may be acquired by the cooperation control setting unit 340 when the controller or the object connects to the communication system 410, or may be acquired through the notification from the controller or the object connected to the communication system 410.

The cooperation control setting unit 340 adjusts the setting of a cooperation control for the controllers or the objects according to the acquired combination information of the controllers or the versions of the objects. The adjustment of the setting of the cooperation control means the adjustments of priority levels of the cooperation control for the controlled object among the controllers, or among the objects, or among the object and the controller that is not yet handled as the object as well as the amount of the cooperation control for the controlled object by the controller or the object by the cooperation control unit 330 according to the configuration of the controllers or the objects.

Moreover, the cooperation control setting unit 340 adjusts the setting of a cooperation control for a common device that is commonly used in different vehicle types, different intra boxes, or in the same vehicle time with different vehicle control systems having different controllers connected thereto. As a result, a commonlyed general purpose controller can be easily installed in various vehicles.

Moreover, it is desirable that the cooperation control setting unit 340 determines the suitability of the controllers which are under the cooperation control by the cooperation control unit 330 on the basis of the response contents to the inquiry of the product information for the controllers. For instance, when a controller does not respond to the inquiry, the cooperation control setting is not performed for the controller, and the cooperation control by the cooperation control unit 330 is prohibited for the controller.

Furthermore, the cooperation control setting unit 340 can perform an appropriate operation such as refusal of connection of an updated controller or an updated object to the vehicle control system 18 when the update of the software/hardware/object of the controller is not in synchronization with the update of the other controllers. That is, when inconsistency of vehicle control due to the version un-match among the controllers/objects or between the controllers and the objects is expected, the connection of the updated controllers/objects will not be allowed.

Moreover, the cooperation control setting unit 340 may notify the controller of the cooperation control setting information. The controller can voluntarily set a cooperation control necessary for the behavior control of the controlled object on the basis of the cooperation control setting information that has been notified from the cooperation control setting unit 340. As a result, the communication load between the controller and the cooperation control setting unit 340 for the adjustment of the setting of the behavior control by the controller can be reduced.

It is desirable that the cooperation control setting unit 340 transmits connection procedure, connection timing for a connection to the cooperation control unit 330, as well as disconnection procedure, disconnection timing from the cooperation control unit 330 to the controllers as the cooperation control setting information. As a result, the connection time of the controller to the cooperation control unit 330 can be shortened as much as possible. Therefore, the communication load, power consumption, and heat generation by the controller can be reduced.

The cooperation control unit 330 installed independently from the controllers performs the cooperation control for each of the controllers, and the cooperation control setting unit 340 adjusts the setting of the cooperation control by the cooperation control unit 330 in a unified manner. Therefore, there is no need to have a cooperation control function and a cooperation control setting adjustment function in each of the controllers. As a result, the amount of hardware and the amount of software that are required for the cooperation control and the cooperation control adjustment function can be reduced.

Furthermore, because the cooperation control setting unit 340 that is functionally independent from the controllers performs the setting of the cooperation control by the cooperation control unit 330, the cooperation control setting unit 340 can perform the adjustments of the setting of the cooperation control for the controllers in association with the connection/disconnection of the controller, replacement of the software/hardware of the controller and the like without an involvement of the functions of the controller. Therefore, 'Plug and Play' of the controller can be realized by using the intra box 320 in the vehicle.

Furthermore, by only adjusting a vehicle type specific portion of the cooperation control setting for the controller, for example, the intra box 320 for general purposes can be easily used for the adjustments of the cooperation control setting according to each of the vehicle types.

(Authentication Unit)

The authentication unit 235 determines the suitability of the controller that is connected to the cooperation control unit 330. The authentication unit 235 does not permit the connection of the controller to the cooperation control unit 330 if the controller is illegal device such as an altered device. For instance, the authentication unit 235 having a list of authentication numbers of the controllers does not permit a cooperation control by the cooperation control unit 330 if the authentication number of the controller is not listed. The cooperation control by the cooperation control unit 330 is permitted when the authentication number is listed.

(Memory Unit)

The memory unit 245 memorizes the setting of a cooperation control for the controllers as a map on the basis of the combination information of the controllers to which the cooperation control unit 330 executes a cooperation control in association with each of the vehicle types. The cooperation control setting information map is stored, for each vehicle type, as a single entry or as multiple entries. The cooperation control setting unit 340 selects and switches the maps according to the combination information of the controllers, and adjusts the setting of a cooperation control for the controllers to which the cooperation control unit 330 executes a cooperation control on the basis of the selected map.

Thus, the adjustment of the setting of a cooperation control for the controllers can be easily adjusted on the basis of the map by memorizing the combination information of the controllers to which the cooperation control unit 330 executes a cooperation control in two or more maps in advance.

The intra box 320 may acquire the combination information of the controllers by detecting the controller to which the cooperation control unit 330 executes a cooperation control, and may accept the request of the setting of a cooperation control from the controller. The setting of the cooperation control requested by the controller includes a priority level of the behavior control, allowable delay time and the like regarding the behavior control. The intra box 320 adjusts the setting of a cooperation control by the cooperation control setting unit 340 based on the combination information of the controllers and a setting request of a cooperation control from the controller.

Further, the intra box 320 may adjust the setting of a cooperation control of the controller according to the combination information of the controllers without memorizing the cooperation control setting information map of each vehicle type in the memory unit 245. The intra box 320 re-writes the setting information map of a cooperation control on the basis of the setting information of the adjusted cooperation control.

As a result, there is no need to memorize multiple cooperation control setting information maps for the adjustments of the setting of a cooperation control. Therefore, the volume of the memory unit 245 can be reduced. Moreover, the cooperation control setting can be flexibly adjusted according to the combination information instead of fixed setting information stored in the maps, thereby enabling an easy accommodation of the configuration change of the connected controller that is controlled by the cooperation control unit 330.

Seventh Embodiment

Figure 23:
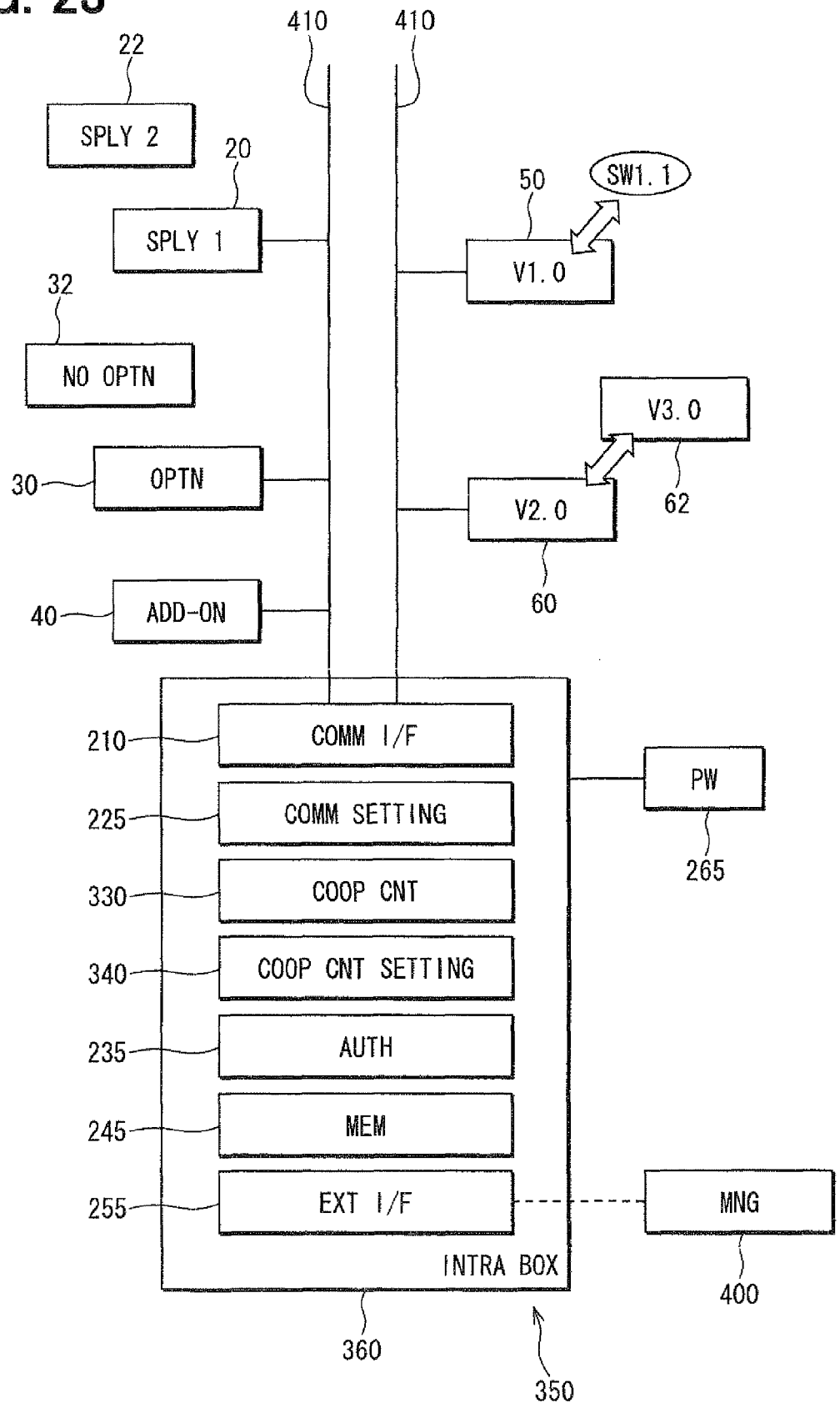
FIG. 23 is a block diagram that shows the vehicle control system in a seventh embodiment.

FIG. 23 shows a vehicle control system in the seventh embodiment of the present invention. Like reference numbers are attached to like parts as the third embodiment.

In a vehicle control system 350 of the present embodiment, an intra box 360 is composed of the communication interface unit 210, the communication setting unit 225, the cooperation control unit 330, the cooperation control setting unit 340, the authentication unit 235, the memory unit 245, and the external interface unit 255, and the like.

In a word, the vehicle control system that is composed of the intra box 360 and the communication system 410 provides the same configuration, the same operations and the advantageous effects from the combination of the vehicle control systems in the second and sixth embodiments.

Other Embodiments

Although the present invention has been fully described in connection with the preferred embodiment thereof with reference to the accompanying drawings, it is to be noted that various changes and modifications will become apparent to those skilled in the art.

For example, a system configuration that has multiple domain managers as the domain controller is explained. In contrast, the vehicle control system may have only one domain controller. In such a system configuration, the same intra box 200 may be used and the same common control may be performed as a configuration that has the multiple domain controllers.

In the above embodiment, the cooperation control unit 80 is provided as a separate unit from the intra box 200 that serves as a vehicle control device. In contrast, the cooperation control unit 80 may be installed in the intra box 200.

In the above embodiments (i.e., second to fourth embodiments), two or more controllers are connected to the communication system. However, the communication system having only one controller may be feasible as the vehicle control system. Even in that case, because the communication setting unit independently adjusts the communication setting for the controller in a unified manner, the controller needs not have the communication setting function.

In the above-mentioned embodiments, the example of composing the intra box and the controller from different processors is described. However, at least a part of the communication setting unit for communication of the controller/intra box or a part of the cooperation control unit/cooperation control setting unit may be composed of the same processor as the controller. Even in that case, the adjustment function of the communication setting by the communication setting unit and the adjustment function of the setting of a cooperation control by the cooperation control setting unit are provided separately and independently from the behavior control by the controller.

Moreover, at least a part of the authentication unit 235, the memory unit 245 for memorizing the map, or the external interface unit 255 may be omitted in the second to seventh embodiments.

Moreover, the electric power for the controllers and for the intra box may be provided from the same power supply.

Such changes and modifications are to be understood as being within the scope of the present invention as defined by the appended claims.

What is claimed is:

1. A common control apparatus comprising:
   a plurality of controllers for providing processing; and
   an interface unit for interfacing with the plurality of controllers in terms of establishing communication, wherein information is acquired from and provided for each of the plurality of controllers through the interface unit independently from processing of each of the controllers; and
   a common control unit for managing the plurality of controllers that control respective function domains of controlled objects in a vehicle by performing common control that is common for the plurality of controllers through the interface unit, wherein
   the plurality of controllers respectively perform behavior control of controlled objects in the function domains,
   the common control is independent from the behavior control of the controlled objects, and
   the common control apparatus serves as a vehicle control apparatus for use in a vehicle.

2. The common control apparatus of claim 1 further comprising:
   a cooperation unit for performing cooperation control that depends on at least one of the behavior control by one of the plurality of the controllers and cooperation of the behavior control by the plurality of the controllers, wherein
   the common control unit performs the common control that is independent from the cooperation control.

3. The common control apparatus of claim 1 further comprising:
   a control condition manager for managing a control condition that is commonly used for the behavior control of the controlled objects by the plurality of controllers, wherein
   the common control unit includes the control condition manager.

4. The common control apparatus of claim 3, wherein
   the control condition includes at least one of a schedule, a time, an event, data and a mode.

5. The common control apparatus of claim 3 further comprising:
   a parameter adjustment unit for adjusting use of a common parameter that is commonly used for the behavior control by the controller, wherein
   the control condition manager includes the parameter adjustment unit.

6. The common control apparatus of claim 5, wherein
   the parameter adjustment unit adjusts synchronization of use of the common parameter by the plurality of controllers.

7. The common control apparatus of claim 2 further comprising:
   a control condition manager for managing a control condition that is commonly used in the behavior control of the controlled objects by the plurality of controllers; and
   a parameter adjustment unit for adjusting use of a common parameter that is commonly used for the behavior control by the plurality of controllers, wherein
   the common control unit includes the control condition manager, and the control condition manager includes the parameter adjustment unit.

8. The common control apparatus of claim 2 further comprising:
a control condition manager for managing a control condition that is commonly used when the behavior control of the controlled objects is performed by the plurality of controllers and when the cooperation control is performed by the cooperation unit; and
a parameter adjustment unit for adjusting synchronization of use of a common parameter that is commonly used among the plurality of controllers or among the plurality of controllers and the cooperation unit, wherein
the common control unit includes the control condition manager, and
the control condition manager includes the parameter adjustment unit.

9. The common control apparatus of claim 5, wherein
the parameter adjustment unit adjusts use of the common parameter in a time-divisional manner for each of function units of the behavior control of the controlled objects performed by the plurality of controllers.

10. The common control apparatus of claim 5, wherein
the parameter adjustment unit adjusts use of the common parameter by the plurality of controllers based on a use request from at least one of the plurality of controllers.

11. The common control apparatus of claim 3 further comprising:
an inspection unit for inspecting abnormal behavior of at least one of the plurality of controllers, wherein
the common control unit includes the inspection unit, and
the control condition manager manages the control condition based on a result of the inspection by the inspection unit.

12. The common control apparatus of claim 1 further comprising:
an inspection unit for inspecting abnormal behavior of at least one of the plurality of controllers, wherein
the common control unit includes the inspection unit.

13. The common control apparatus of claim 3 further comprising:
a resource manager for managing a resource that is commonly used by the plurality of controllers, wherein
the control condition manager manages the control condition based on a condition of usage of the resource that is managed by the resource manager.

14. The common control apparatus of claim 1 further comprising:
a resource manager for managing a resource that is commonly used by the plurality of controllers, wherein
the common control unit includes the resource manager.

15. The common control apparatus of claim 13, wherein
the resource manager distributes the resource upon receiving a use request from at least one of the plurality of controllers based on a priority of each of the plurality of controllers.

16. The common control apparatus of claim 13, wherein
the resource manager distributes the resource to each of the plurality of controllers based on a degree of emergency of each of the plurality of controllers.

17. The common control apparatus of claim 3 further comprising:
a plug-and-play manager for managing a plug-and-play of each of the plurality of controllers, wherein
the common control unit includes the plug-and-play manager, and
the control condition manager manages the control condition based on a system configuration by each of the plurality of controllers that are managed by the plug-and-play manager.

18. The common control apparatus of claim 1 further comprising:
a plug-and-play manager for managing a plug-and-play of each of the plurality of controllers, wherein
the common control unit includes the plug-and-play manager.

19. The common control apparatus of claim 1 further comprising:
an inspection unit for inspecting abnormal behavior of each of the plurality of controllers; and
a resource manager for managing a resource that is commonly used by the plurality of controllers and for managing use of the resource by the plurality of controllers based on an inspection result by the inspection unit, wherein
the common control unit includes the inspection unit and the resource manager.

20. The common control apparatus of claim 1 further comprising:
an inspection unit for inspecting abnormal behavior of each of the plurality of controllers; and
a plug-and-play manager for managing a plug-and-play of each of the plurality of controllers and for restricting change of system configuration by each of the plurality of controllers based on an inspection result by the inspection unit, wherein
the common control unit includes the inspection unit and the plug-and-play manager.

21. The common control apparatus of claim 1 further comprising:
a resource manager for managing a resource that is commonly used by the plurality of controllers; and
a plug-and-play manager for managing a plug-and-play of each of the plurality of controllers and for restricting change of system configuration by the plurality of controllers based on an inspection result by the inspection unit, wherein
the common control unit includes the resource manager and the plug-and-play manager.

22. The common control apparatus of claim 3 further comprising:
an inspection unit for inspecting abnormal behavior of each of the plurality of controllers;
a resource manager for managing a resource that is commonly used by the plurality of controllers; and
a plug-and-play manager for managing a plug-and-play of each of the plurality of controllers, wherein
the common control unit includes the inspection unit, the resource manager and the plug-and-play manager, and
the control condition manager manages the control condition based on at least two of inspection information from the inspection unit, resource management information from the resource manager, and system management information from the plug-and-play manager.

23. The common control apparatus of claim 1, wherein
the common control unit includes an operation unit and an information storage that are provided independently for dedicated use.

24. The common control apparatus of claim 1, wherein
the common control unit includes a power unit that is provided independently for dedicated use.

25. The common control apparatus of claim 1, wherein use of the common control apparatus is in one of a power control apparatus and a communication control apparatus that are commonly used with another apparatus.

26. The common control apparatus of claim 1 further comprising:
a synchronization unit for controlling synchronization adjustment during performing a plurality of the common control, wherein
the common control unit includes the synchronization unit.

27. A vehicle control system comprising:
a plurality of controllers for performing behavior control of controlled objects in a function disposed in a vehicle; and
the common control apparatus of claim 1.

28. A common control apparatus comprising:
a plurality of controllers for providing processing; and
an interface unit for interfacing with the plurality of controllers in terms of establishing communication, wherein information is acquired from and provided for each of the plurality of controllers through the interface unit independently from processing of each of the controllers; and
a communication setting unit for adjusting communication setting of a communication system that establishes communication between the plurality of controllers that are used for behavior control of controlled objects, wherein
the communication setting unit is disposed separately from the plurality of controllers, and the common control apparatus serves as a vehicle control apparatus for use in a vehicle.

29. The common control apparatus of claim 28 further comprising:
a storage for storing a plurality of maps that define the communication setting of the controller according to combination information of connected controllers that are connected to the communication system, wherein
the communication setting unit switches the maps according to the combination information and adjusts the communication setting based on the map.

30. The common control apparatus of claim 28, wherein
the communication setting unit acquires the combination information and adjusts the communication setting of the controllers based on the acquired combination information.

31. The common control apparatus of claim 29, wherein
the communication setting unit acquires, as the combination information, a supplier of the controller.

32. The common control apparatus of claim 29, wherein
the communication setting unit acquires, as the combination information, whether there is an optional function or not in the controller.

33. The common control apparatus of claim 29, wherein
the communication setting unit acquires, as the combination information, a version number of software of the controller.

34. The common control apparatus of claim 29, wherein
the communication setting unit acquires, as the combination information, a part number of the controller.

35. The common control apparatus of claim 29, wherein
the communication setting unit acquires, as the combination information, product information of the controller that is added to the communication system.

36. The common control apparatus of claim 29 further comprising:
an authentication unit for authenticating whether the controller being added to the communication system is suitable or not.

37. The common control apparatus of claim 29, wherein
the communication setting unit defines a functional object for each of a plurality of functions by employing at least one controller, and adjusts the communication setting by a unit of the functional object.

38. The common control apparatus of claim 37, wherein
the communication setting unit acquires the version number of the functional object, and adjusts the communication setting of the functional object based on the acquired version number of the functional object.

39. The common control apparatus of claim 28, wherein
the communication setting unit adjusts the communication setting of the controller that is commonly used.

40. The common control apparatus of claim 28, wherein
the communication setting unit inquires of the controller connected to the communication system about information of the communication setting.

41. The common control apparatus of claim 28, wherein
the communication setting unit notifies the controller being connected to the communication system of the information of the communication setting.

42. The common control apparatus of claim 41, wherein
the communication setting unit notifies the controller being connected to the communication system of connection procedure as well as connection timing for connecting to the communication system, and of disconnection procedure as well as disconnection timing from the communication system.

43. The common control apparatus of claim 28, wherein
a plurality of communication systems are respectively interfaced with the interface unit, and
at least one of the plurality of communication systems is connected to the controller.

44. The common control apparatus of claim 43 further comprising:
a gateway unit for performing data transfer between the plurality of interface units.

45. The common control apparatus of claim 43, wherein
at least one of the plurality of interface units uses a different communication specification from the other interface units.

46. The common control apparatus of claim 43, wherein
the interface unit and the communication system connected thereto form a pair, and
each of a plurality of pairs of the interface unit and the communication system has respectively different power source that provides electricity.

47. The common control apparatus of claim 43, wherein
the interface unit and the communication system connected thereto form a pair,
information is shared by a plurality of pairs, and
each of the plurality of the pairs is connected to a common power source that provides electricity.

48. The common control apparatus of claim 28, wherein
electricity is provided from a power source that is different from a power source that provides electricity for the controller.

49. The common control apparatus of claim 28, wherein
the communication setting unit is set up on a processor that is different from a processor that is set up as the controller.

50. The common control apparatus of claim 28 further comprising:
an external interface unit for interfacing with a management unit that adjusts communication setting of the controller.

51. The common control apparatus of claim 28 further comprising:
an external interface unit for interfacing with a management unit that determines whether the controller is suitable or not.

52. A vehicle control system comprising: a controller for controlling behavior of controlled objects disposed in a vehicle; and the common control apparatus of claim 28.

53. The common control apparatus of claim 28 further comprising:
a cooperation control unit for performing cooperation control between a plurality of controllers, wherein the cooperation control unit is set up separately from the controller for performing the behavior control of controlled objects in a vehicle; and
a cooperation adjustment unit for adjusting setting of the cooperation control performed by the cooperation control unit, wherein the cooperation adjustment unit is set up separately from the controller.

54. A common control apparatus comprising:
a plurality of controllers for providing processing; and
an interface unit for interfacing with the plurality of controllers in terms of establishing communication, wherein information is acquired from and provided for each of the plurality of controllers through the interface unit independently from processing of each of the controllers;
a cooperation control unit for performing cooperation control between a plurality of controllers, wherein the cooperation control unit is set up separately from the controller for performing the behavior control of controlled objects in a vehicle; and
a cooperation adjustment unit for adjusting setting of the cooperation control performed by the cooperation control unit, wherein the cooperation adjustment unit is set up separately from the controller.

55. The common control apparatus of claim 54 further comprising:
a storage for storing a plurality of maps that define the setting of the cooperation control according to combination of controllers that are subject to the cooperation control performed by the cooperation control unit, wherein
the cooperation adjustment unit acquires combination information about the combination of controllers, and adjusts the setting of the cooperation control by switching the maps according to the acquired combination information.

56. The common control apparatus of claim 54, wherein
the cooperation adjustment unit acquires combination information about combination of the controllers that are subject to the cooperation control performed by the cooperation control unit, and adjusts the setting of the cooperation control based on the acquired combination information.

57. The common control apparatus of claim 55, wherein
the cooperation adjustment unit acquires, as the combination information, a supplier of the controller.

58. The common control apparatus of claim 55, wherein
the cooperation adjustment unit acquires, as the combination information, whether there is an optional function or not in the controller.

59. The common control apparatus of claim 55, wherein
the cooperation adjustment unit acquires, as the combination information, a version number of software of the controllers that are subject to the cooperation control performed by the cooperation control unit.

60. The common control apparatus of claim 55, wherein
the cooperation adjustment unit acquires, as the combination information, a part number of the controllers that are subject to the cooperation control performed by the cooperation control unit.

61. The common control apparatus of claim 55, wherein
the cooperation adjustment unit acquires, as the combination information, product information of the controller that is added after production.

62. The common control apparatus of claim 54 further comprising:
an authentication unit for authenticating whether the controller under cooperation control by the cooperation control unit is suitable or not.

63. The common control apparatus of claim 54, wherein
the cooperation adjustment unit defines a functional object for each of a plurality of functions by employing at least one controller, and adjusts the setting of the cooperation control by a unit of the functional object.

64. The common control apparatus of claim 63, wherein
the cooperation adjustment unit acquires the version number of the functional object, and adjusts the setting of the cooperation control of the functional object based on the acquired version number of the functional object.

65. The common control apparatus of claim 54, wherein
the cooperation adjustment unit adjusts the setting of the cooperation control of the controller that is commonly used.

66. The common control apparatus of claim 54, wherein
the cooperation adjustment unit inquires of the controller about setting information of the cooperation control.

67. The common control apparatus of claim 54, wherein
the cooperation adjustment unit notifies the controller of setting information of the cooperation control.

68. The common control apparatus of claim 67, wherein
the cooperation adjustment unit notifies the controller of connection procedure as well as connection timing for connecting to the cooperation control unit, and of disconnection procedure as well as disconnection timing from the cooperation control unit.

69. The common control apparatus of claim 54, wherein
electricity is provided from a power source that is different from a power source that provides electricity for the controller.

70. The common control apparatus of claim 54 wherein
the cooperation control unit and the cooperation adjustment unit are respectively set up on a processor that is different from a processor that is set up as the controller.

71. The common control apparatus of claim 54 further comprising:
an external interface unit for interfacing with a management unit that adjusts setting of the cooperation control.

72. A common control apparatus comprising:
a plurality of controllers for providing processing; and
an interface unit for interfacing with the plurality of controllers in terms of establishing communication, wherein information is acquired from and provided for each of the plurality of controllers through the interface unity independently from processing of each of the controllers;
an interface unit for interfacing with a communication system that connects a plurality of controllers that perform behavior control of controlled objects disposed in a vehicle;
a communication setting unit for adjusting communication setting of the controller that communicates through the communication system, wherein the communication setting unit is disposed separately from the controller;

a cooperation control unit for performing cooperation control between a plurality of controllers, wherein the cooperation control unit is set up separately from the plurality of controllers; and a cooperation adjustment unit for adjusting setting of the cooperation control performed by the cooperation control unit, wherein the cooperation adjustment unit is set up separately from the plurality of controllers.

* * * * *